United States Patent
Miyamoto et al.

(10) Patent No.: US 7,106,751 B2
(45) Date of Patent: Sep. 12, 2006

(54) APPARATUS FOR LINKING A SAN WITH A LAN

(75) Inventors: Takahisa Miyamoto, Ebina (JP); Kazuko Iwatsuki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 983 days.

(21) Appl. No.: 10/076,513

(22) Filed: Feb. 19, 2002

(65) Prior Publication Data

US 2002/0114328 A1 Aug. 22, 2002

(30) Foreign Application Priority Data

Feb. 20, 2001 (JP) .............................. 2001-042691

(51) Int. Cl.
H04L 12/28 (2006.01)
H04J 3/16 (2006.01)

(52) U.S. Cl. ...................................... 370/401; 370/466

(58) Field of Classification Search ................ 370/466, 370/475, 389, 392, 395.53, 467, 428, 474, 370/473, 415, 401–403
See application file for complete search history.

(56) References Cited

U.S. PATENT DOCUMENTS

| | | | |
|---|---|---|---|
| 6,160,793 A * | 12/2000 | Ghani et al. ................. | 370/236 |
| 6,310,884 B1 * | 10/2001 | Odenwald, Jr. ............. | 370/412 |
| 6,400,730 B1 * | 6/2002 | Latif et al. .................. | 370/466 |
| 6,535,518 B1 * | 3/2003 | Hu et al. ..................... | 370/401 |
| 6,680,955 B1 * | 1/2004 | Le .............................. | 370/477 |
| 6,757,291 B1 * | 6/2004 | Hu ............................. | 370/401 |
| 6,839,872 B1 * | 1/2005 | Kohda ........................ | 714/712 |
| 2005/0078704 A1 * | 4/2005 | Anderson et al. .......... | 370/466 |

OTHER PUBLICATIONS

TechFest, "TechFest Ethernet Technical Summary—Ethernet Frame Strucure", p. 1, © 1999, www.techfest.com/networking/lan/ethernet2.htm.*
http://www.ietf.org/rfc/rfc2625.txt, pp. 1-63.
http://www.ietf.org/internet-drafts/draft-ietf-ips-fcovertcpip-0.7.txt, pp. 1-56.

* cited by examiner

Primary Examiner—Ricky Q. Ngo
Assistant Examiner—Warner Wong
(74) Attorney, Agent, or Firm—Mattingly, Stanger, Malur & Brundidge, P.C.

(57) ABSTRACT

A linking apparatus receives a first packet from a first network. When the first packet does not include a first header, a receiving section of the linking apparatus reads out a first header, which is stored after being associated with packet identification information having the same value as for packet identification information included in the first packet, from the stored first headers to output the first packet to which the first header is added. A sending section converts the first packet to a second packet to send the second packet to a second network.

18 Claims, 20 Drawing Sheets

| LAYER3 | LAYER2 | TRANSMISSION PORT | MAXIMUM PACKET LENGTH | |
|--------|--------|-------------------|----------------------|---|
| IP-A | MAC-A | PORT B | LEN A | 3401 |
| 3109 | 3310 | 3303 | 3402 | |

APPARATUS FOR LINKING A SAN WITH A LAN

BACKGROUND OF THE INVENTION

The present invention relates to a technology for enabling mutual communications by connecting a local area network (LAN) with a storage area network (SAN) which cannot communicate directly with each other since they have different network protocols. The present invention enables a direct connection between the LAN and the SAN, in other words, an access to a storage device (a magnetic disk or an optical disk) connected to the SAN or a server from a personal computer (PC) or a work station (WS) which is connected to the LAN.

With explosive widening of the Internet, the transmission control Protocol (TCP) and the Internet protocol (IP) emerged as standard protocols for communications via a network. The TCP and IP are typical protocols for the LAN constructed in a company or a school. As a physical network used for the LAN, Ethernet is the mainstream. There are 10 Mbps (mage (a million) bit per second), 100 Mbps, and 1 Gbps (giga (a billion) bit per second) of Ethernet lines having different transmission speeds. It should be noted that, however, they are different only in the transmission speed. These Ethernet lines use the same packet format on a physical network, thus securing mutual connectivity.

The widely spread LAN is suitable for a connection between information processing units such as a PC and a WS, but they are unsuitable for connecting information storage devices such as a magnetic disk and an optical disk. It is because, while data communicated between the information processing units has a relatively small amount such as several hundreds of bytes or so (for example, a processing request and a processing result), data sent or received between information storage devices has a very large amount such as several kilobytes to several megabytes (for example, customer information). The SAN was invented as a network suitable for communications with these information storage devices. The SAN expanded the conventional small computer serial interface (SCSI) connection. As a physical network used for the SAN, Fibre Channel is the mainstream. The Fibre Channel has the following features appropriate for a connection with information storage devices:

(1) Enabling a 1-Gbps or higher speed communication;
(2) Enabling a long-distance communication of several to tens of kilometers; and
(3) Enabling a very reliable communication since it has a flow control mechanism and a resending control mechanism.

The SAN is continuously spreading around large-sized data centers. Therefore, it is expected that future networks in companies or schools will be composed of LANs and SANs.

To connect the LAN with the SAN directly, some methods are suggested. Internet Engineering Task Force (IETF) is going on with standardizing the following technologies, some of which completed to be standardized:

(1) RFC2625: IP and ARP Over Fibre Channel (2) DRAFT: Fibre Channel Over TCP/IP

These technologies secure connectivity between the LAN and the SAN communicating with each other over IP by encapsulating IP for a Fibre Channel packet.

On the other hand, National Committee for Information Technology Standards (NCITS) is going on with standardizing the following technologies for directly connecting a wide area network (WAN) with the SAN:

(3) Fibre Channel Back Bone Rev 4.7

On a parallel with the standardization of these technologies, there are venture companies performing anticipatory product development and prior investment in the markets mainly in the U.S. Under the existing conditions, however, the mutual connectivity has not been secured yet between the LAN and the SAN.

SUMMARY OF THE INVENTION

The inventors examined problems on communications between the Fibre Channel and the Ethernet. These problems will be described hereinafter.

A communication between the Fibre Channel and the Ethernet will now be described first, by giving an example.

Referring to FIG. 29, there is shown a network system comprising a communication device "A" (3001), a communication device "B" (3002), and a linking apparatus (3003). Each communication device is illustrated by using an OSI 7 hierarchical model. The communication device "A" (3001), the communication device "B" (3002), and the linking apparatus (3003) are connected to each other via communication lines (3010) and (3011). In this example, the communication line (3010) in the communication device "A" (3001) side is assumed to be Fibre Channel and the communication line (3011) in the communication device "B" (3002) side is to be the Ethernet. The OSI 7 hierarchy has the highest Layer 7, the second highest Layer 6, and after to the lowest Layer 1. This section describes Layer 3 (3004 and 3006) and Layer 2 (3005, 3007, and 3009). A protocol independent on the communication line is applied to the Layer 3 (3004 and 3006). For example, IP is applied to the Layer 3 for the LAN, while SCSI or IP is applied to the Layer 3 for the SAN. For a mutual connection between the LAN and SAN, the same protocol need be applied to Layer 3 (3004, 3006, and 3008) for both. Therefore, in this example, IP is applied to the Layer 3 (3004, 3006, and 3008) protocols. A protocol dependent on the communication line is applied to the Layer 2 (3005, 3007, and 3009). For example, Ethernet is applied to the Layer 2 for the LAN and Fibre Channel is applied to the Layer 2 for the SAN.

To connect lines having different characteristics, a linking apparatus (3003) is required for a mutual conversion between protocols in the Layer 2 (3005, 3007, and 3009). The linking apparatus (3003) has two or more ports, and sends a packet received at one port to the other port. In this case, the linking apparatus (3003) converts a packet format, if necessary.

Referring to FIG. 36, there is shown a format of a packet communicated in Ethernet. Referring to FIG. 37, there is shown a format of a packet communicated in Fibre Channel. In FIG. 36, an Ethernet header includes a destination MAC address and a source MAC address. Data includes user data discussed later, a TCP header, an IP header, and so forth. FCS (Frame Check Sequence) includes an error-detecting code. The Ethernet header is 14-bytes long, and the data portion has a length of 1,500 bytes maximum. FCS is 4-bytes long. Therefore, the maximum packet length in a packet in the Ethernet equals 1,518 bytes including the FCS. In FIG. 37, a FC header includes a destination FC address and a source FC address as described later. Data includes user data described later. In some cases, the data also includes a TCP header, an IP header, etc. described later. CRC (Cyclic Redundancy Check) includes data for an error control. The FC header is 24-bytes long, and CRC is 4-bytes long. The data portion has a length of 2,112 bytes maximum. Therefore, the maximum packet length of a packet is 2,140 bytes in the Fibre Channel.

For a case of FIG. 29, a FC packet sent from the communication device "A" (3001) is sent (3012) to the linking apparatus (3003) via the Fibre Channel (3010). The linking apparatus (3003) converts a packet format of the received FC packet, and then sends (3013) the converted Ethernet packet to the communication device "B" (3002) via the Ethernet (3011).

The linking apparatus (3003) needs to have a common protocol such as IP as a Layer 3 protocol (3008) to secure mutual connectivity in the Layer 3 like the communication devices (3001 and 3002).

The following describes a packet sending process of the communication device "A" (3001) by using FIGS. 30 and 31. Referring to FIG. 30, there is shown a processing flow in which the communication device "A" (3001) transmits user data (3105). This user data (3105) is generated by application located in a higher layer than Layer 4 shown in FIG. 30. In FIG. 30, the user data (3105) is generated in Layer 7. It is assumed that a protocol of the Layer 3 (3103) is IP and a protocol of the Layer 4 (3102) is TCP. User data (3105) generated in the Layer 7 (3101) is passed to the Layer 4 (3102) via Layer 6 and Layer 5. In the Layer 4 (3102), after TCP protocol processing, a TCP header (3107) is added to the user data (3105) to generate a Layer 4 packet (3106). The generated Layer 4 packet (3106) is passed to the Layer 3 (3103). In the Layer 3, IP protocol processing is performed for the received Layer 4 packet (3106).

In the Layer 3 (3103), after protocol processing, an IP header (3109) is added to the Layer 4 packet (3106) to generate a Layer 3 packet (3108). Also, in the Layer 3 (3103), the length of the generated Layer 3 packet (3108) is compared with the maximum packet length defined for the packet transmission line. If the length of the layer 3 packet (3108) is greater than the maximum packet length, it cannot be sent directly, and therefore the packet is divided in the Layer 3 (3103). In the Layer 3 (3103), an IP header (3112) is added to the divided user data (3113) to generate a new Layer 3 packet (3111). The respective Layer 3 packets are passed to the Layer 2 (3104).

In the Layer 2 (3104), Layer 2 protocol processing is performed and a FC header (3115) is added. Previous to sending a packet with the FC header to the Fibre Channel (3010), the packet is divided in the Layer 2 (3104) (the packet processing in the Layer 2 is not performed for the Ethernet). Therefore, as shown in FIG. 30, the first Layer 3 packet (3108) is divided into a Layer 2 packet 1 (3114) and a Layer 2 packet 2 (3118), and the second Layer 3 packet (3111) is divided into a Layer 2 packet 3 (3120) and a Layer 2 packet 4 (3122). An FC header is added to each Layer 2 packet. The FC header comprises, as shown in FIG. 31, a destination FC address (3201) which is an identifier indicating a destination, a source FC address (3202) which is an identifier indicating a transmission source, a frame ID (3203) allocated by the transmission source, a frame CTL (3204) indicating which portion of the divided packet it is, and other header information (3205). If the packet is divided before transmission, an identical value is applied to the frame ID (3203) for all packets. In other words, the Layer 2 packet 1 (3114) and the Layer 2 packet 2 (3118) have identical frame ID values. From this frame ID (3203), which packets originate from the same packet can be determined at reconstructing the divided packets. The frame CTL (3204) comprises "1st" indicating a head of the divided packet, "END" indicating an end of it, "1st/END" indicating both of the head and the end (in other words, a single packet not divided), and "NULL" indicating the second to the second end (i.e., "END"-1). From this frame CTL (3204), it can be determined whether the packet is divided; if so, where the packet had been located. The header specifications of the Fibre Channel are standardized in the NCITS, and therefore a draft is available on the WWW or the like.

The Fibre Channel largely differs from the Ethernet in line characteristics, and therefore a packet format may be inconvertible in some cases. Referring to FIG. 32, there is shown a diagram of a situation in which the linking apparatus (3003) shown in FIG. 29 relays a packet. The linking apparatus (3003) has a relay table (3401) shown in FIG. 33, and uses it to decide a destination and to convert a packet format of the destination line. As described above, a packet cannot be converted in the Layer 2 between the Fibre Channel and the Ethernet, and therefore the linking apparatus (3003) converts it in the Layer 3. Accordingly, the information on the relay table (3401) is related to the Layer 3 information as shown in FIG. 33. The packet relay process will be described hereinafter on condition that the relay table (3401) in FIG. 33 is used.

Port "A" (3302) of the linking apparatus (3003) is connected to the Fibre Channel (3010) to receive the packet (3114). The packet (3114) has FC-A (3115), IP-A (3109), TCP (3107), and user data (3117). It should be noted that, however, the IP-A (3109) indicates an IP address of a communicating partner, while the entire IP header is included in addition to the address in areas indicated by the IP-A (3109) shown in FIGS. 32 and 33. In FIG. 32, particularly address information is focused on for explanation, and therefore only the address information is mentioned. In the same manner, the FC-A (3115) indicates address information for identifying a communicating partner in a layer for protocol processing specialized in a Fibre Channel communication line, and header information is also included in the area indicated by the FC-A (3115) shown in FIG. 32 in addition to the address. The linking apparatus (3003) reads the IP-A (3109) which is Layer 3 information of the received packet, and retrieves the relay table (3401) by the value. As a result of the retrieval, it acquires MAC-A (3310) which is a destination MAC address and also Layer 2 information, a transmission port, Port "B" (3303) which is a contact point of the linking apparatus with the Ethernet (3011) which is a destination network, and Len-A (3402) which is the maximum packet length defined for the destination line. The linking apparatus (3003) removes the FC-A (3115) from the received packet (3114), and adds the acquired MAC-A (3310) to the packet to generate a packet (3304), and then sends the packet (3304) to the transmission port, Port "B" (3303). The area indicated by MAC-A (3310) shown in FIG. 32 includes not only the MAC address of the communicating partner, but also other information needed in the layer for protocol processing specialized in the Ethernet (3011) if the communication line is the Ethernet (3011).

As shown in FIG. 30, the second packets (a packet (3118) and a packet (3122) in FIG. 30) divided in the Layer 2 (3104) do not include IP information. It is because in the Layer 2 the packet passed from the Layer 3 is divided in such a way that the IP-A (3109) which is header information of the Layer 3 (3103), TCP (3108) which is data information, and user data (3110) are collected together as single data information, and then a Layer 2 header is added to each packet after the division. Likewise, the divided second and subsequent packets have no IP header storing IP information, and therefore the linking apparatus (3003) cannot retrieve the relay table (3401). Accordingly, the linking apparatus (3003) cannot convert the received packet (3118) to a transmission packet (3305).

From the above reason, when the linking apparatus (3003) relays the packet from the Fibre Channel to the Ethernet, the linking apparatus (3003) once reconstructs the packet group divided in the Layer 2 in the transmission device. Then, the linking apparatus (3003) sends the reconstructed packet to an object network.

Referring to FIG. 34, there is shown an example that the linking apparatus (3003) reconstructs (3502) two packets (3114, 3118) divided in the Layer 2 in the transmission device into a single Layer 3 packet (3501), and further re-divides (3503) it to generate two Layer 2 packets (3504, 3506). Sizes of individual packets to be re-divided (3503) depend upon the maximum data length per packet of a destination line. In general, the maximum data length per packet of the Fibre Channel is 2,112 bytes as shown in FIG. 37. On the other hand, the maximum data length per packet of the Ethernet is 1,500 bytes, which is smaller than the maximum data length of the Fibre Channel. Therefore, if data having a large size is exchanged, it is more likely re-divided (3503).

If the linking apparatus performs the relay process as discussed above, the linking apparatus can reconstruct the packets only after receiving all the divided packets naturally. Therefore, the linking apparatus requires a memory for the reconstruction. If there are a large number of lines to be contained or a large amount of data is exchanged, a bulk memory is required as a memory for the reconstruction. As a linking apparatus having a bulk memory and capable of a reconstruction (and re-dividing, if necessary), a server is preferable. Therefore, as shown in FIG. 2, generally a server is used as a linking apparatus and the LAN (202) is connected to the SAN (201) via the server (server "A" (205)). The server, however, performs a relay process with software, and therefore it is hard to perform packet integration and the re-division at a high speed. As a result, it is hard for the server to relay a packet at a high speed. In addition, in case of an increase of storage devices (storage device "A" (207), storage device "B" (208)) or user terminals (user terminal "A" (203), user terminal "B" (204)), an access count to the server is increased correspondingly, thereby making the server performance insufficient. To resolve the server performance insufficiency, a server (server "B" (206)) is added. Whenever it is added, however, path information must be re-set or a new IP address need be allocated to the additional server since the network topology is changed. This need for the network management may lead to a problem such as a suspension of service caused by a management error, or an increase of a management cost.

Therefore, according to the present invention, there is provided a linking apparatus, which is connected to a first network such as a SAN as a transfer destination of a first packet having a first header such as a FC header and having a second header such as an IP header depending on circumstances, and connected to a second network such as a LAN as a transfer destination of a second packet including a MAC address and having a third header and a second header like those used for the Ethernet, the linking apparatus for converting the first packet received from the first network to the second packet and sending it to the second network.

A header identification section of this linking apparatus is used for determining whether the first packet received from the SAN or the like has the second header, on the basis of packet control information (for example, frame CTL) included in the first packet. A header storing section reads the second header information of the first packet determined to have the second header by the header identification section, and the first packet identification information (for example, frame ID) of the first packet, and then associates the second header information with the first packet identification information and stores them. A first header adding section retrieves the first packet identification information stored in the header storing section on the basis of second packet identification information (for example, frame ID) of the first packet determined not to have the second header by the header identification section. Finding the first packet identification information corresponding to the second packet identification information as a result of the retrieval, the first header adding section acquires the second header information stored with being associated with the first packet identification information, and adds the second header to the first packet having no second header. A header removing section removes the first header from the first packet determined to have the second header, or the first packet to which the second header is added by the first header adding section. The second header adding section adds the third header to the first packet from which the first header is removed by the header removing section.

Provided with the above arrangement, the linking apparatus is capable of adding the second header such as an IP header to each of the divided first packets without reconstructing packets.

Other objects, features and advantages of the invention will become apparent from the following description of the embodiments of the invention taken in conjunction with the accompanying drawings.

DETAILED DESCRIPTION OF THE EMBODIMENTS

The embodiments of the present invention will now be described hereinafter with reference to the accompanying drawings.

This embodiment will be described on condition that an IP network system is used. In addition, it will be described supposing that a SAN physical network is Fibre Channel and a LAN physical network is Ethernet.

Figure 1:
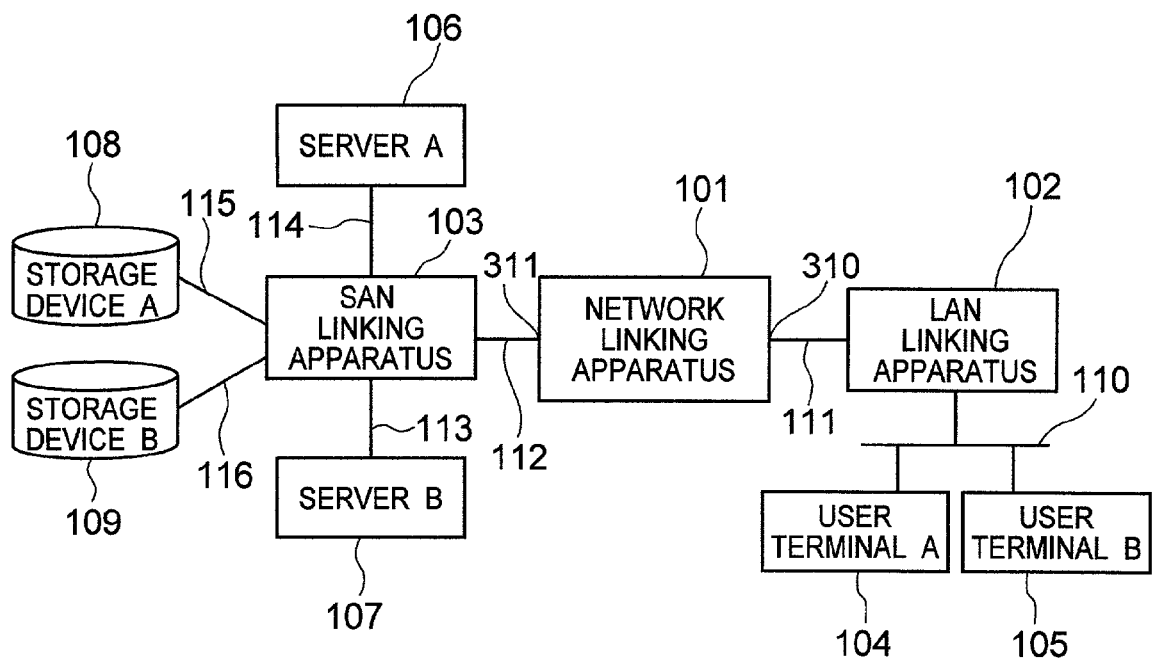
FIG. 1 is a diagram showing a network system in which a LAN and a SAN are connected with each other via a network linking apparatus.
Figure 2:
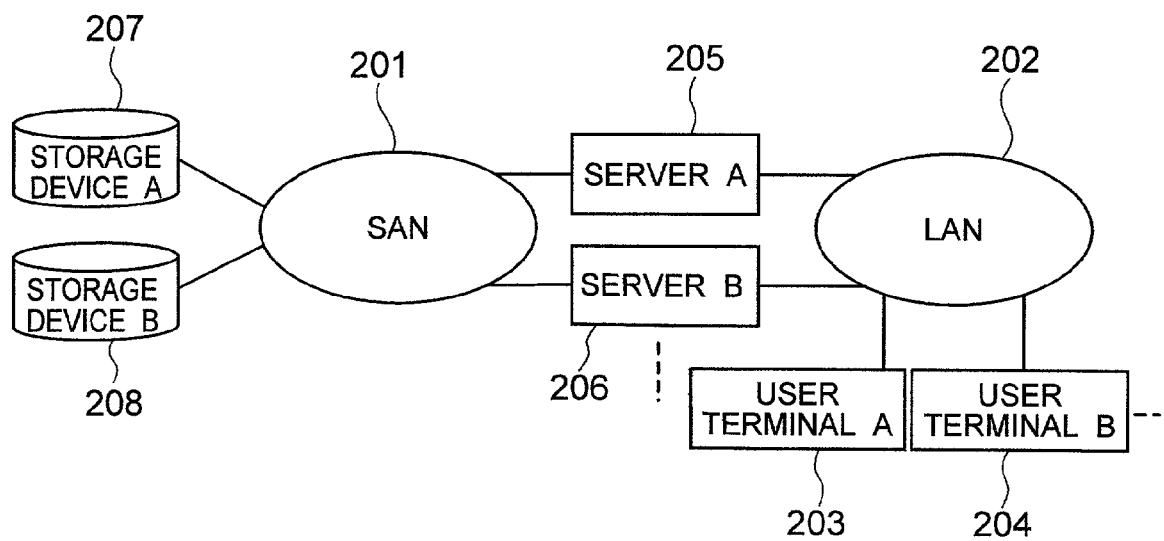
FIG. 2 is a diagram showing a network system in which a LAN and a SAN are connected with each other via a server.

Referring to FIG. 1, there is shown a network system in which the LAN and the SAN are connected with each other via a network linking apparatus (101).

The network linking apparatus (101) in FIG. 1 has two ports. Port-1 (310) which is one of the two ports is connected to the Ethernet (111) which forms the LAN. The other Port-2 (311) is connected to the Fibre Channel (112) which forms the SAN. While two ports are used for connecting a single SAN with a single LAN as for the number of ports in this embodiment, actually there will be a case of mutually connecting networks using different network protocols such as a wide area network (WAN) other than the SAN and the LAN. Therefore, the network linking apparatus (101) may have three or more ports. In addition, the ports of the network linking apparatus (101) may be allocated to a plurality of SANs, respectively, so as to connect the SANs via the network linking apparatus (101). In the same manner, it is also possible to connect a plurality of LANs via the network linking apparatus (101) to construct a network system.

The Port-1 (310), which is a LAN-side port of the network linking apparatus (101), communicates with the LAN linking apparatus (102) via Ethernet (111). The LAN linking apparatus (102) is connected to a user terminal "A" (104) and to a user terminal "B" (105) via Ethernet (110). The LAN linking apparatus (102) is, for example, a LAN switch. On the other hand, the Port2 (311), which is a SAN-side port of the network linking apparatus (101), is connected to a SAN linking apparatus (103) via Fibre Channel (112). The SAN linking apparatus (103) is connected to a server "A" (106), a server "B" (107), a storage device "A" (108), and a storage device "B" (109) via Fibre Channel lines (113, 114, 115, and 116), respectively. While the servers and the storage devices are connected in a star network around the SAN linking apparatus (103) in FIG. 1, servers and storage devices can be connected in any of other network topologies. The SAN linking apparatus (103) is, for example, a Fibre Channel switch.

There is no limitation on the combination types of user terminals, servers and storage devices, and the number thereof. Furthermore, while the single LAN linking apparatus (102) and the single SAN linking apparatus (103) are shown in FIG. 1, two or more LAN linking apparatuses or SAN linking apparatuses can be arranged in the network system or between the user terminals and the storage devices.

Figure 3:
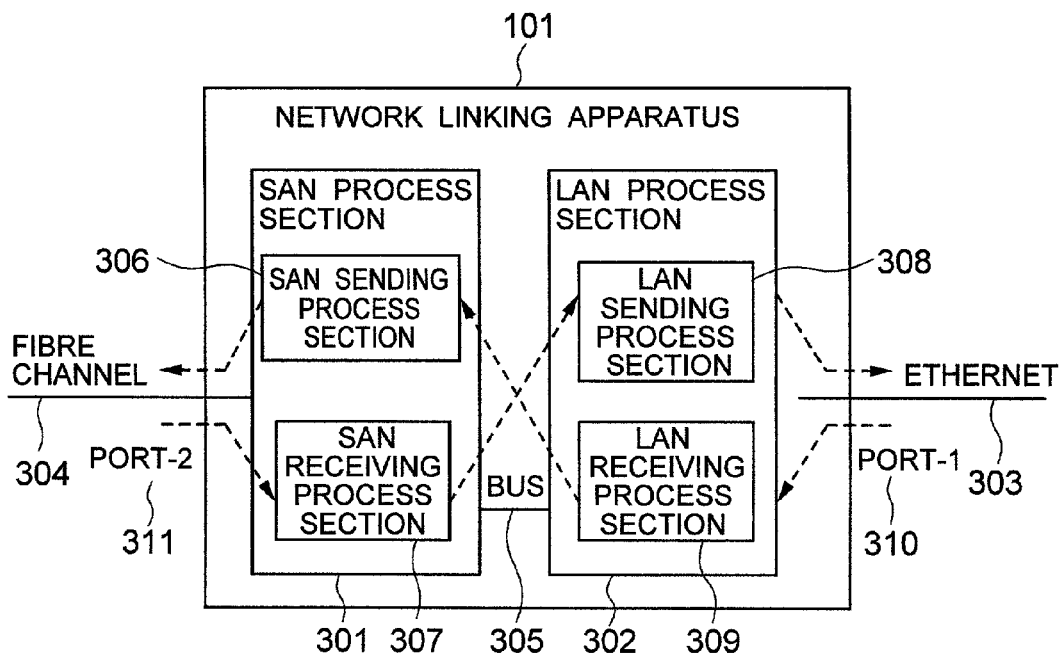
FIG. 3 is a diagram showing an internal configuration of the network linking apparatus.

The following describes an internal configuration and an operation of the network linking apparatus (101) by using FIG. 3. The network linking apparatus (101) connects Fibre Channel (304) with Ethernet (303). While the single Fibre Channel (304) and the single Ethernet (303) are connected via the network linking apparatus (101) in FIG. 3, a plurality of communication lines may be connected via the network linking apparatus (101) as mentioned above. The network linking apparatus (101) comprises a SAN process section (301), a LAN process section (302), and a bus (305). The SAN process section (301) sends or receives packets to or from the SAN. The LAN process section (302) sends or receives packets to the LAN. The bus (305) connects the SAN process section (301) to the LAN process section (302). The SAN process section (301) comprises a SAN sending process section (306) for sending packets to the SAN, and a SAN receiving process section (307) for receiving packets from the SAN. The LAN process section (302) comprises a LAN sending process section (308) for sending packets to the LAN, and a LAN receiving process section (309) for receiving packets from the LAN.

Configurations and operations of the LAN receiving process section (309) of the LAN process section (302) and the SAN sending process section (306) of the SAN process section (301) will be described below by using an example of sending packets from the Ethernet (303) to the Fibre Channel (304).

The network linking apparatus (101) receives a packet from the Ethernet (303) at the Port-1 (310). The network linking apparatus (101) processes the received packet first at the LAN receiving process section (309) of the LAN process section (302).

Figure 4:
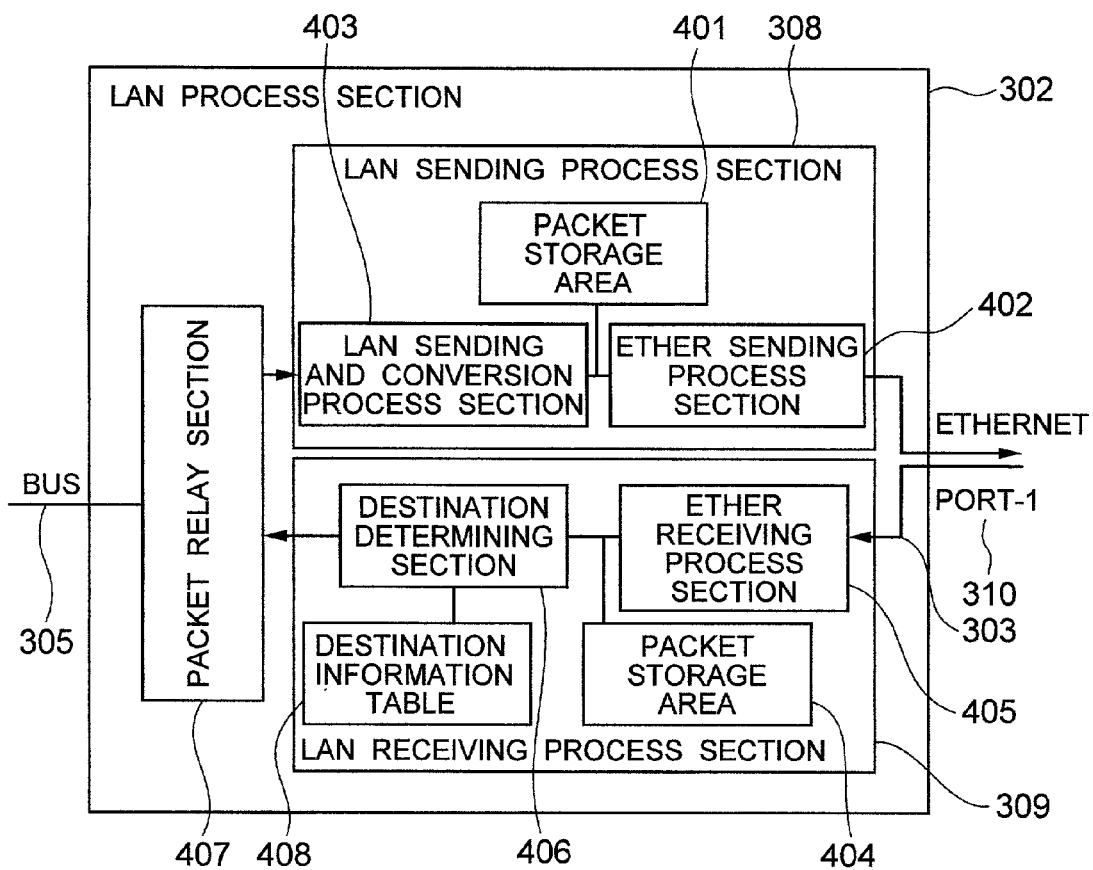
FIG. 4 is a diagram showing an internal configuration of a LAN process section.

An internal configuration of the LAN process section (302) is shown in FIG. 4.

The LAN process section (302) comprises the LAN sending process section (308), the LAN receiving process section (309), and a packet relay section (407).

Figure 5:
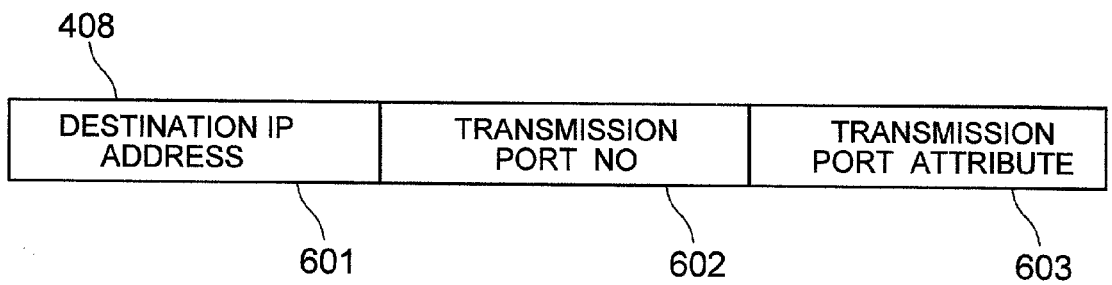
FIG. 5 is a diagram showing a destination information table structure.

The LAN receiving process section (309) comprises, as shown in FIG. 4, an Ether receiving process section (405), a packet storage area (404), a destination determining section (406), and a destination information table (408). The Ether receiving process section (405) refers to a MAC address added to a header of the packet to determine whether the packet is addressed to the network linking apparatus (101). If so, the Ether receiving process section (405) performs Ethernet packet receiving process. The Ethernet packet receiving process includes a CRC check or the like, for example. The packet storage area (404) is a storage area for temporarily storing a packet received by the Ether receiving process section (405). The packet storage area (404) is arranged in a storage area of a semiconductor memory such as a RAM in the network linking apparatus (101), for example. The destination information table (408) includes, as shown in FIG. 5, a destination IP address (601), a transmission port No. (602), and a transmission port attribute (603). Each of the information included in the destination information table (408) is stored in a semiconductor memory such as a RAM in the network linking apparatus (101), for example. The destination IP address (601) is used for retrieving the destination information table (408) by a destination IP address included in a received packet. The transmission port No. (602), which is information for use in determining sending process section in the network linking apparatus (101) in which the received packet should be processed next, indicates a transmission port No. of each sending process section. The transmission port attribute (603) is information for use in identifying a network class of a network to which the received packet is sent. The destination determining section (406) refers to a destination IP address included in the received packet to retrieve the destination IP address (601) of the destination information table (408). Finding the destination IP address (601) matching the destination IP address of the received packet, the destination determining section (406) acquires a transmission port No. (602) registered in the destination information table (408) with being associated with the destination IP address (601), and subsequently specifies a sending process section where this packet is to be processed next. Furthermore, by acquiring information of the transmission port attribute (603) corresponding to the destination IP address (601), the destination determining section (406) is enabled to perform preprocessing for converting the received packet to a packet on the destination network. For example, if a network having received a packet differs from a network to which the packet is just to be sent in their physical layers and data link layers in the OSI 7 hierarchical model as described in this embodiment, the receiving process section receives the packet from one network and executes processing of the two layers, and then header information related to these two layers are removed. Therefore, some inconvenience may occur in subsequent packet processing in the sending process section. In this condition, it is effective to determine a network class of the destination network in the receiving process section and to perform necessary processing before removing the header information. When a packet received from the Ethernet is sent to the Fibre Channel, the LAN receiving process section (309) need not perform preprocessing, thereby not using information of the transmission port attribute (603). In the example of this transmission port attribute (603), there are network classes such as the "Ethernet" and the "Fibre Channel". There are two methods of generating the destination information table (408); one is a manual generation by a network administrator, and the other is an automatic generation with a route calculation protocol such as a routing information protocol (RIP). Both methods are applicable in this embodiment. As an Ethernet header added to the packet and including a MAC address is information not used in the SAN sending process section (306), it is removed in the LAN receiving process section (309). After performing the above receiving process, the LAN receiving process section (309) sends the packet to the SAN process section (301) via the packet relay section (407) and the bus (305). The packet relay section (407) relays a packet between the LAN process section (302) and the bus (305) or between the LAN sending process section (308) and the LAN receiving process section (309). When the packet relay section (407) relays a packet, information of the transmission port No. (602) is used.

The packet sent from the LAN receiving process section (309) is received by the SAN process section (301) via the bus (305).

Figure 8:
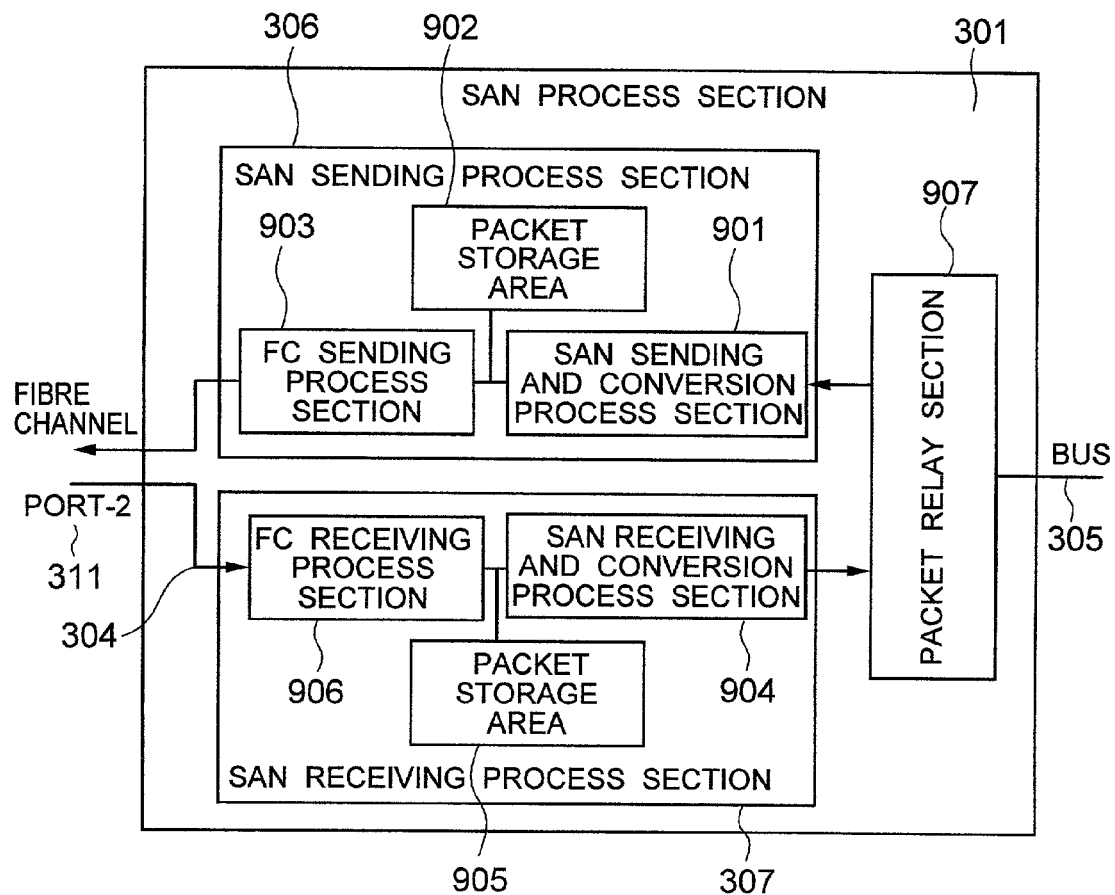
FIG. 8 is a diagram showing an internal configuration of a SAN process section.

An internal configuration of the SAN process section (301) is shown in FIG. 8.

The SAN process section (301) comprises a SAN sending process section (306), a SAN receiving process section (307), and a packet relay section (907).

The packet relay section (907) relays a packet between the SAN process section (301) and the bus (305) or between the SAN sending process section (306) and the SAN receiving process section (307). Therefore, the packet sent from the LAN receiving process section (309) via the bus (305) is received by the packet relay section (907), and then relayed to the SAN sending process section (306).

Figure 11:
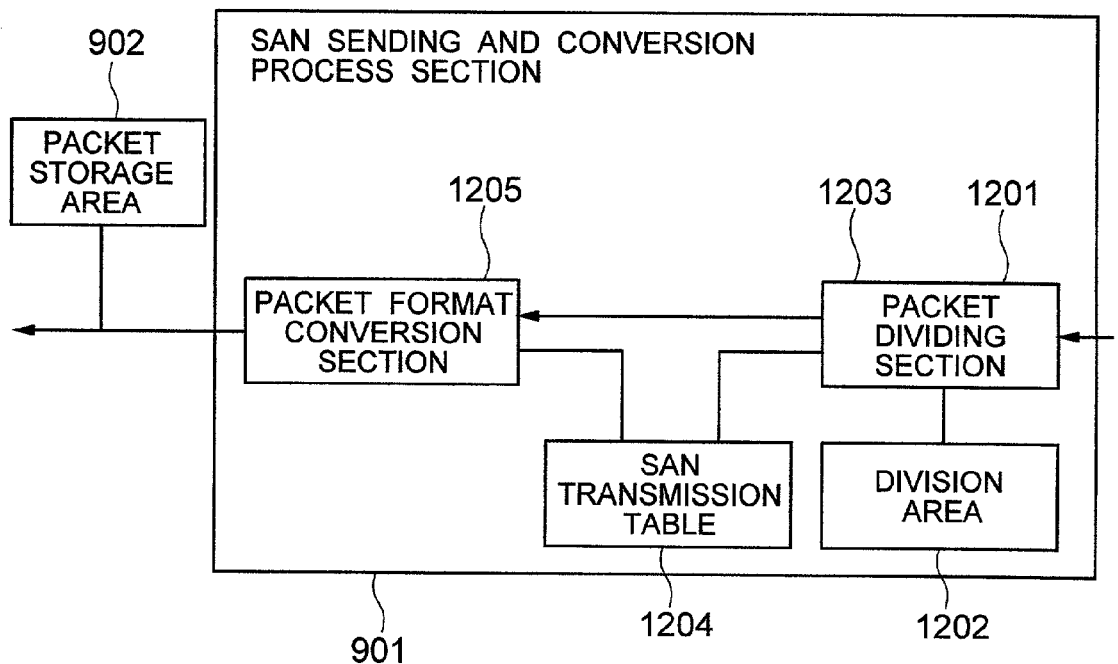
FIG. 11 is a diagram showing a diagram showing an internal configuration of a SAN sending and conversion process section.

The SAN sending process section (306) comprises, as shown in FIG. 11, a SAN sending and conversion process section (901), a packet storage area (902), and a FC sending process section (903). The SAN sending process (306) receives a packet from the packet relay section (907). The received packet is first processed by the SAN sending and conversion process section (901).

The SAN sending and conversion process section (901) comprises, as shown in FIG. 11, a packet dividing section (1201), a packet format conversion section (1205), a division area (1202), and a SAN transmission table (1204). The packet dividing section (1201) retrieves the SAN transmission table (1204) to determine whether the packet received from the packet relay section (907) is longer than the maximum packet length defined for the Fibre Channel (304). If the received packet is longer than the maximum packet length, the packet dividing section (1201) divides the received packet. The division area (1202) is a storage area for storing a sent packet temporarily when the packet dividing section (1201) divides the packet. The division area (1202) is arranged in a storage area of a semiconductor memory such as a RAM contained in the network linking apparatus (101), for example. The packet format conversion section (1205) generates a FC header including a FC (Fibre Channel) address or the like. Then, the packet format conversion section (1205) adds the generated FC header to the sent packet to convert the sent packet format to a Fibre Channel packet format. When it is determined whether the packet dividing section (1201) divides the packet and when the packet format conversion section (1205) adds the FC header to the packet, the SAN transmission table (1204) is retrieved by the packet dividing section (1201) or the packet format conversion section (1205).

Figure 12:
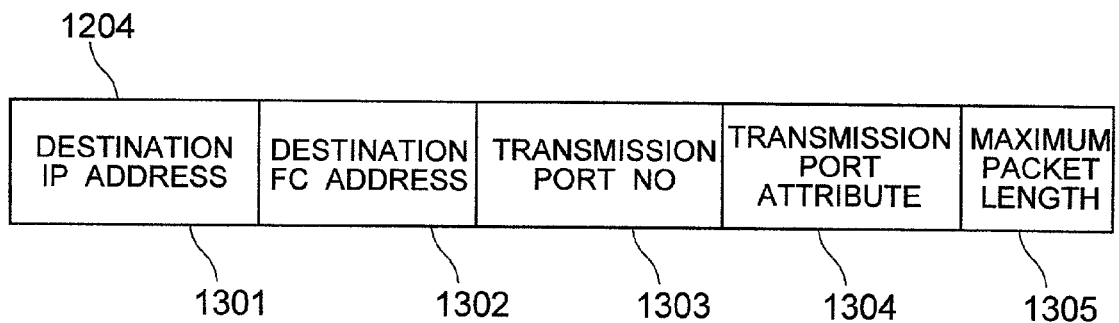
FIG. 12 is a diagram showing a SAN transmission table structure.

Referring to FIG. 12, there is shown a SAN transmission table (1204) structure. The SAN transmission table (1204) includes a destination IP address (1301), a destination FC address (1302), a transmission port No. (1303), a transmission port attribute (1304), and the maximum packet length (1305). The maximum packet length (1305) is the maximum packet length defined for the Fibre Channel (304), and it is, for example, 2,140 bytes. Each information included in the SAN transmission table (1204) is stored in a semiconductor memory such as a RAM contained in the network linking apparatus (101), for example. There are two methods of generating the SAN transmission table (1204); one is a manual generation by a network administrator, and the other is an automatic generation with an address resolution protocol (ARP). Both of the methods are applicable for the present invention.

A packet output from the packet dividing section (1203) is input to the packet format conversion section (1205). The packet format conversion section (1205) refers to the destination IP address included in the received packet to retrieve a transmission IP address (1301) of the SAN transmission table (1204). Finding a destination IP address (1301) matching the destination IP address of the received packet, the packet format conversion section (1205) acquires a destination FC address (1302) registered in the SAN transmission table (1204) with being associated with the destination IP address (1301). The packet format conversion table (1205) generates a FC header including the destination FC address (1302) and adds it to the packet. The packet input to the packet format conversion table (1205) by these processes is converted to a FC packet.

The packet processed in the SAN sending and conversion process section (901) is temporarily stored in a packet storage area (902). The FC sending process section (903) performs general processes to be executed in the Layer 2 (the data link layer) such as a generation of CRC (Cyclic Redundancy Check) data for an error control. After completing the required processes set forth hereinabove, the SAN sending process section (306) sends the FC packet to the Fibre Channel (304) via the Port-2 (311). Thereby, a series of processes of the network linking apparatus (101) are completed.

The following describes a configuration and an operation of the SAN receiving process section (307) of the SAN process section (301) and those of the LAN sending process section (308) of the LAN process section (302) by giving an example of sending a packet from the Fibre Channel (304) to the Ethernet (303).

The network linking apparatus (101) receives the packet from the Fibre Channel (304) at the Port-2 (311). The received packet is sent to the SAN receiving process section (307) of the SAN process section (301).

The SAN receiving process section (307) comprises, as shown in FIG. 8, a FC receiving process section (906), a packet storage area (905), and a SAN receiving and conversion process section (904). Receiving the packet from the Fibre Channel (304), the FC receiving process section (906) performs packet processes in the Layer 2 level (the data link layer) such as data error detection, a recovery from the error, and a sequence control of data to be sent. The packet storage area (905) is a storage area for temporarily storing a packet received from the Fibre Channel (304). The packet storage area (905) is arranged in a storage area of a semiconductor memory such as a RAM contained in the network linking apparatus (101). The packet stored in the packet storage area (905) is processed in the SAN receiving and conversion process section (904), next. The SAN receiving and conversion process section (904) converts a single or a plurality of received FC packets to an IP packet or IP packets. In addition, the SAN receiving and conversion process section (904) divides the IP packet, if necessary, and further determines a transmission port and a sending process section in the network linking apparatus (101).

Figure 9:
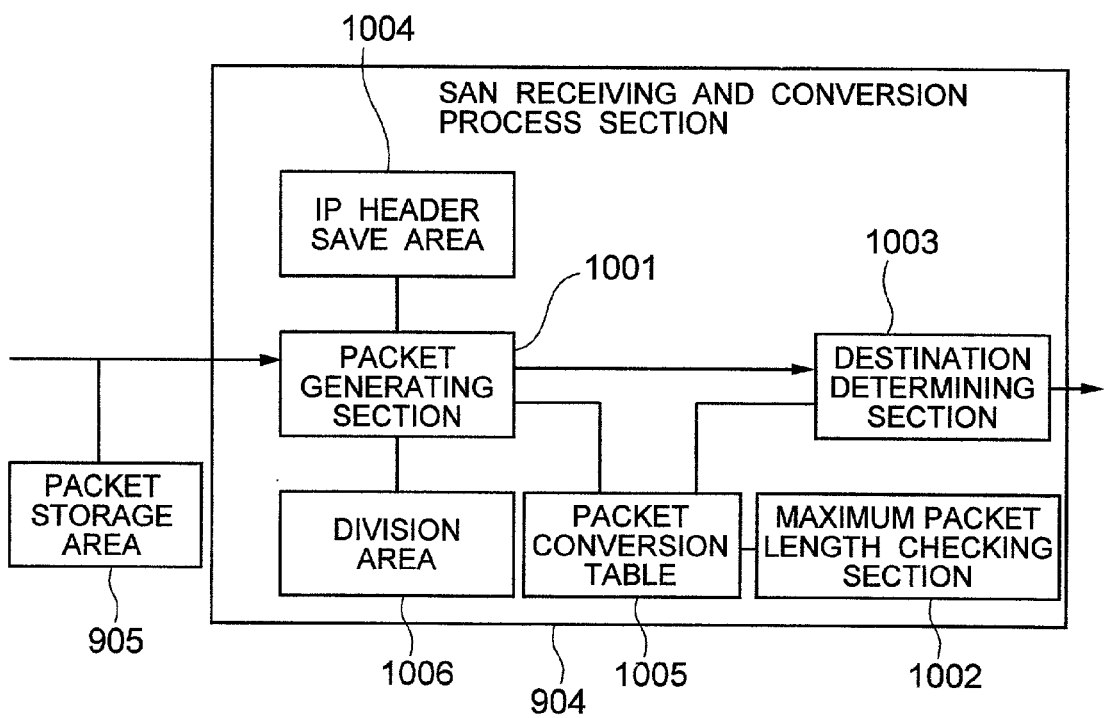
FIG. 9 is a diagram showing an internal configuration of a SAN receiving and conversion process section.
Figure 20:
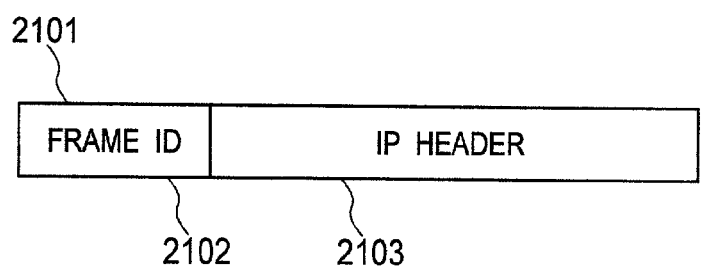
FIG. 20 is a diagram showing header information stored in an IP header save area.

An internal configuration of the SAN receiving and conversion process section (904) is shown in FIG. 9. The SAN receiving and conversion process section (904) comprises a packet generating section (1001), an IP header save area (1004), a destination determining section (1003), a packet conversion table (1005), a division area (1006), and the maximum packet length checking section (1002). The packet generating section (1001) converts the received FC packet to an IP packet. Therefore, the packet generating section (1001) includes a header identification section, a header storing section, and a first header adding section, and functions as those. The header identification section of the packet generating section (1001) checks a value of the frame CTL included in the FC header of the received FC packet to identify the received FC packet as a divided packet and as a head packet including an IP header. If the received FC packet is a part of the divided packet and it is a head packet including the IP header, the header storing section of the packet generating section (1001) stores the IP header included in the FC packet into the IP header save area (1004) together with the frame ID value in the FC header. Referring to FIG. 20, there is shown header information (2101) to be stored in the IP header save area (1004). The header information (2101) comprises a frame ID (2102) and an IP header (2103). By storing the frame ID (2102) in the IP header save area (1004) together with the IP header (2103), the packet generating section (1001) can add the same IP header to a plurality of FC packets originated from a single IP packet in the Layer 3. The first header adding section of the packet generating section (1001) refers to the frame ID included in the FC header of the received FC packet and retrieves the IP header save area (1004) by the frame ID value. Finding a frame ID (2102) matching the frame ID of the received FC packet as a result of the retrieval, the first header adding section of the packet generating section (1001) reads out the IP header (2103) stored with the frame ID (2102) from the IP header save area (1004) and then adds it to the received FC packet. Thereby, the packet generating section (1001) converts the received FC packet to an IP packet.

The packet generating section (1001) further includes a packet dividing section; if a packet length of the converted IP packet is greater than the maximum packet length defined for a destination line, the packet generating section divides the packet. Therefore, the FC packet received from the Fibre Channel is temporarily stored in the division area (1006). The packet having passed through the packet generating section (1001) is input to the destination determining section (1003). The destination determining section (1003) identifies a transmission port connected to the packet destination network. In this example, the packet is sent to the Ethernet, and therefore the destination determining section (1003) identifies the Port-1 (310) of the LAN sending process section (1404) as a transmission port. To determine whether the received FC packet need be divided or to determine to which port in the network linking apparatus (101) the received FC packet should be sent, the packet conversion table (1005) is retrieved by the packet generating section (1001) or the destination determining section (1003).

Figure 10:
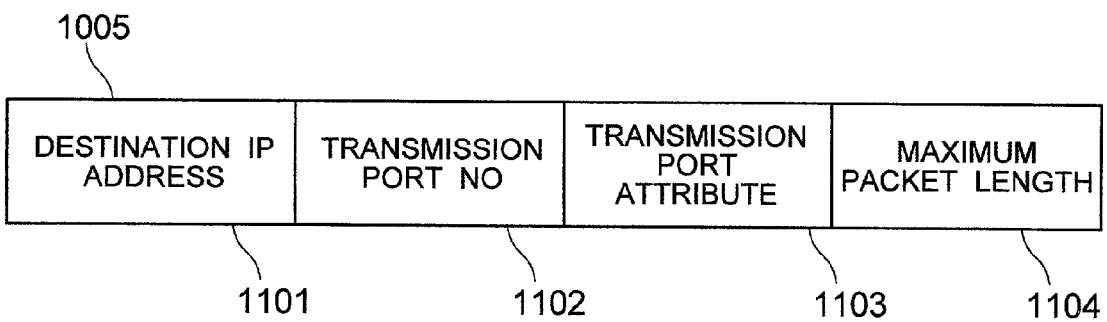
FIG. 10 is a diagram showing a packet conversion table structure.

Referring to FIG. 10, there is shown a packet conversion table (1005) structure. The packet conversion table (1005) comprises a destination IP address (1101), a transmission port No. (1102), a transmission port attribute (1103), and the maximum packet length (1104). This packet conversion table (1005) contains, for example, an IP address allocated to a communication device to which a packet should be sent as the destination IP address (1101), a port number of the Port-1 (310) as the transmission port No., information indicating an "Ethernet" network class as the transmission port attribute (1103), and the maximum packet length defined for the Ethernet (303) as the maximum packet length (1104) such as 1,518 bytes. Each information included in the packet conversion table (1005) is stored in a semiconductor memory such as a RAM contained in the network linking apparatus (101), for example. A method of generating the packet conversion table (1005) is the same as the method of generating the destination information table (408), and therefore its explanation is omitted here.

The maximum packet length checking section (1002) is notified of a change of the maximum packet length defined for the communication line to which the packet should be sent by a maximum packet length change notifying section (704) of the LAN sending and conversion process section (308) described later. Notified of this change, the maximum packet length check section (1002) updates a value of the maximum packet length (1104) already registered in the packet conversion table (1005) according to the notified information.

The FC header added to the received FC packet is unnecessary in the LAN sending process section (308), and therefore it is removed in the SAN receiving process section (307). The FC header is removed by the packet generating section (1001). It should be noted that, however, the FC header can be removed in the destination determining section (1003). The packet generating section (1001) includes a header removing section for executing the FC header removal. The header identification section, the header storing section, and the first header adding section use the frame CTL or frame ID information included in the FC header. Therefore, if the FC header is removed, the header removing section temporarily stores the removed FC header to make other arrangements to refer to the content of the FC header. It is also possible that the first header adding section serves as a header removing section to remove the FC header.

In addition, the SAN receiving process section (307) always need not remove the FC header. In this condition, the SAN receiving process section (307) sends a packet having an IP header added to the head of the packet including data and a FC header, to the LAN sending process section (308). The LAN sending process section (308) treats the FC header as a part of the data and processes the received packet. Accordingly, the packet sent from the LAN sending process section (308) to the Ethernet includes data, a FC header and an IP header, and has an Ethernet header added at the beginning as described later.

After completing the above receiving process, the SAN receiving process section (307) sends the converted IP packet to the LAN sending process section (308) via the packet relay section (907) and the bus (305). The packet relay section (907) relays a packet between the SAN sending process section (306) and the SAN receiving process section (307) or between the SAN process section (301) and the LAN process section (302).

Due to the above operation of the SAN receiving process section, the network linking apparatus (101) need not reconstruct all divided FC packets. The network linking apparatus (101) need not wait until it receives all the divided FC packets, but can send out previously received FC packets to a destination network without leaving them in the network linking apparatus. Therefore, the network linking apparatus (101) can relay packets at a high speed. Furthermore, the network linking apparatus (101) need not have a large storage area for a packet reconstruction process.

Next, an internal configuration of the LAN sending process section (308) is shown in FIG. 4.

The LAN sending process section (308) has a LAN sending and conversion process section (403), a packet storage area (401), and an Ether sending process section (402). The LAN sending and conversion process section (403) performs the addition of MAC address, the division of packet, the conversion of packet format and so forth. The packet storage area (401) is a storage area for temporarily storing packets to be sent to the LAN. The packet storage area (401) is arranged in a storage area of a semiconductor memory such as a RAM contained in the network linking apparatus (101), for example. The Ether sending process section (402) performs a process for sending a packet to the Ethernet (303) such as setting a value of a frame check sequence (FCS) added to the packet.

Figure 6:
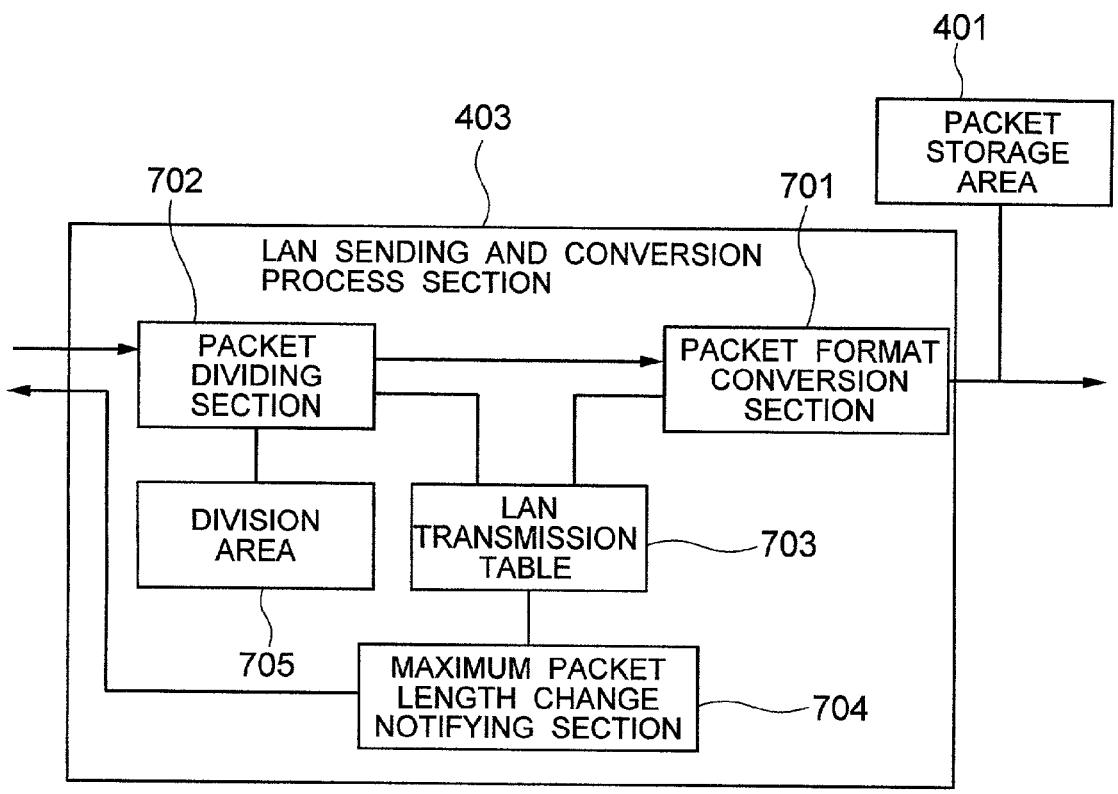
FIG. 6 is a diagram showing an internal configuration of a LAN sending and conversion process section.

Referring to FIG. 6, there is shown an internal configuration of the LAN sending and conversion process section (403).

The LAN sending and conversion process section (403) includes a packet dividing section (702), a division area (705), a packet format conversion section (701), a LAN transmission table (703), and the maximum packet length change notifying section (704).

Figure 7:
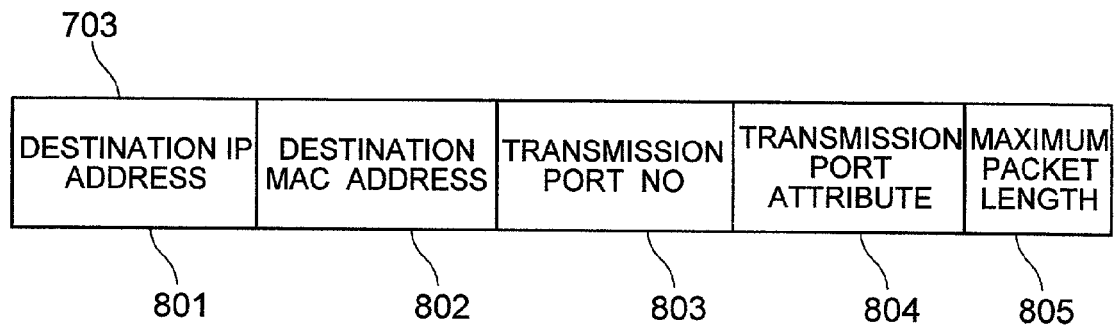
FIG. 7 is a diagram showing a LAN transmission table structure.

Referring to FIG. 7, there is shown a configuration of the LAN transmission table (703). The LAN transmission table (703) includes a destination IP address (801), a destination MAC address (802), a transmission port No. (803), a transmission port attribute (804), and the maximum packet length (805). The destination IP address (801) and the destination MAC address (802) are an IP address and an MAC address allocated to a communication device to which the packet is to be sent. The maximum packet length (805) is the maximum packet length defined for the destination LAN; it is 1,518 bytes, for example. Each information included in the LAN transmission table (703) is stored in a semiconductor memory such as a RAM contained in the network linking apparatus (101), for example. A method of generating the LAN transmission table (703) is the same as the method of generating the SAN transmission table (1204), and therefore its explanation is omitted here.

Receiving the IP packet from the packet relay section (407), the packet dividing section (702) refers to the IP address included in the IP header of the received IP packet, and retrieves a destination IP address (801) of the LAN transmission table (703). Finding an entry having the destination IP address (801) matching the destination IP address of the received IP packet, the packet dividing section (702) reads out the maximum packet length registered in the entry, and then compares a packet length of the received IP packet with the read maximum packet length. If the packet length of the received IP packet is greater than the read maximum packet length, the packet dividing section (702) divides the received IP packet into packets each having the same as or shorter than the read maximum packet length.

The division area (705) is a storage area for temporarily storing an IP packet when the packet dividing section (702) divides the IP packet. The division area (705) is arranged in a storage area of a semiconductor memory such as a RAM contained in the network linking apparatus (101), for example.

The packet format conversion section (701) includes a second header adding section, and retrieves the LAN transmission table (703) by an IP address included in the IP header of the received IP packet. Finding an entry having the destination IP address (801) matching the destination IP address of the received IP packet, the packet format conversion section (701) acquires a destination MAC address (802) registered in the entry, and generates an Ethernet header including the destination MAC address (802). Then, the packet format conversion section (701) adds the generated Ethernet header to the packet, and converts the IP packet into the Ethernet packet format (MAC frame). If the packet format conversion section (701) retrieves the LAN transmission table to add the Ethernet header to the IP packet, the LAN transmission table is used as an address table for acquiring the destination MAC address.

The maximum packet length change notifying section (704) monitors an update of a value of the maximum packet length (805) registered in the LAN transmission table (703) together with a change of the maximum packet length defined for the Ethernet (303). If the value of the maximum packet length (805) is updated, it notifies the SAN process section (301).

With the above sending process, the LAN sending process section (308) sends the packet to the Ethernet (303). This completes a series of processes of the network linking apparatus (101).

The following section concretely describes processing that the network linking apparatus performs when a communication device connected to Ethernet communicates with a communication device connected to Fibre Channel via the network linking apparatus (101) of this embodiment.

Figure 13:
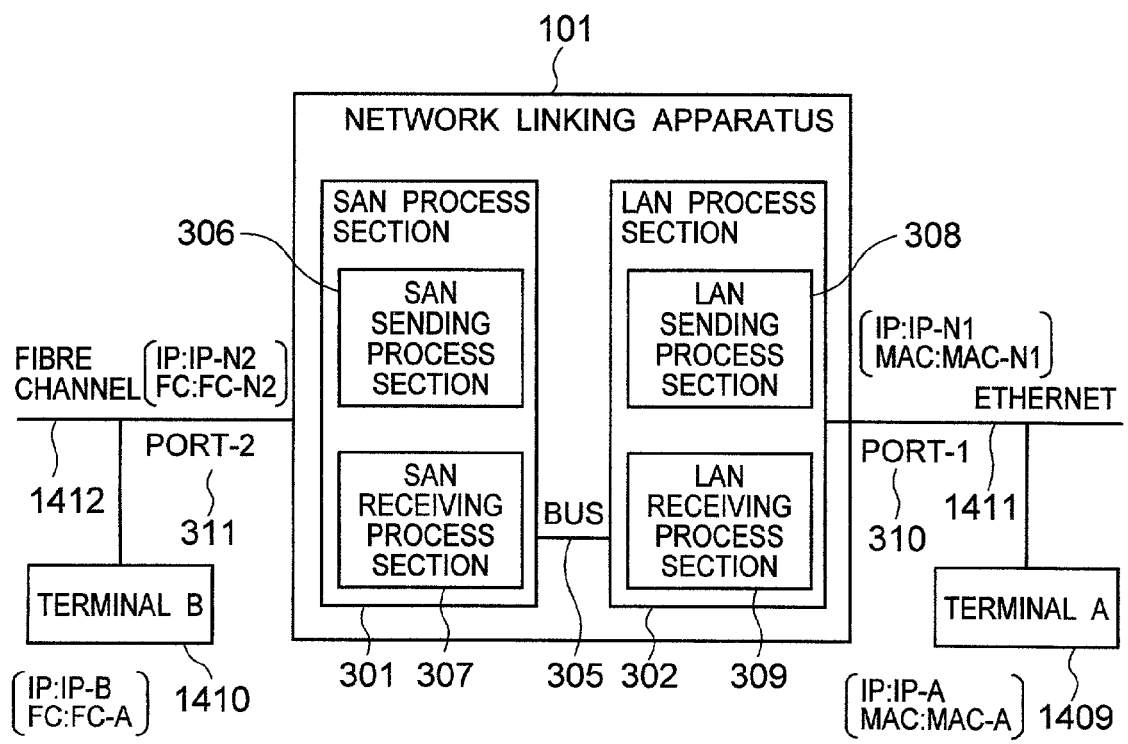
FIG. 13 is a diagram showing a state in which a terminal A and a terminal B are connected with each other via the network linking apparatus.

Referring to FIG. 13, there is shown a state in which a terminal "A" (1409) connected to Ethernet (1411) is connected to a terminal "B" (1410) connected to Fibre Channel (1412) via the network linking apparatus (101). The terminal "A" (1409) is connected to the network linking apparatus (101) by means of the Ethernet (1411) and the terminal "B" (1410) is connected to the network linking apparatus (101) by means of the Fibre Channel (1412). An IP address "IP-A" and a MAC address "MAC-A" are set for the terminal "A" (1409). An IP address "IP-B" and a FC address "FC-A" are set for the terminal "B" (1410). A port in the Ethernet (1411) side of the network linking apparatus (101) is Port-1 (310), and an IP address "IP-N1" and a MAC address "MAC-N1" are set for the Port-1 (310). A port in the Fibre Channel (1412) side of the network linking apparatus (101) is Port-2 (311), and an IP address "IP-N2" and a FC address "FC-N2" are set for the Port-2 (311).

Figure 14:
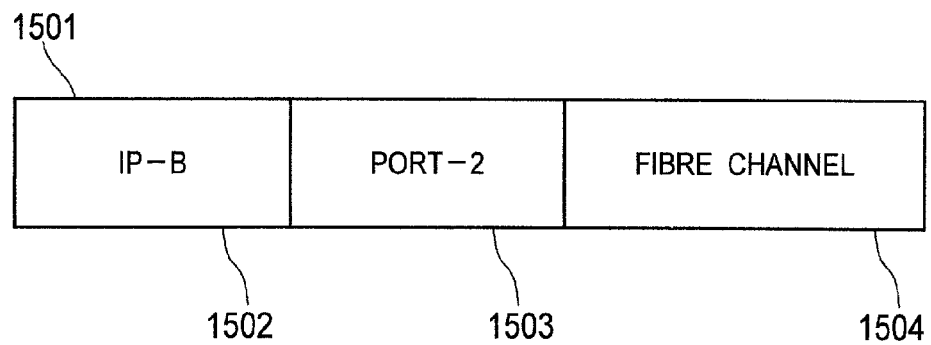
FIG. 14 is a diagram showing a content of a destination information table of a LAN receiving process section shown in FIG. 13.
Figure 15:
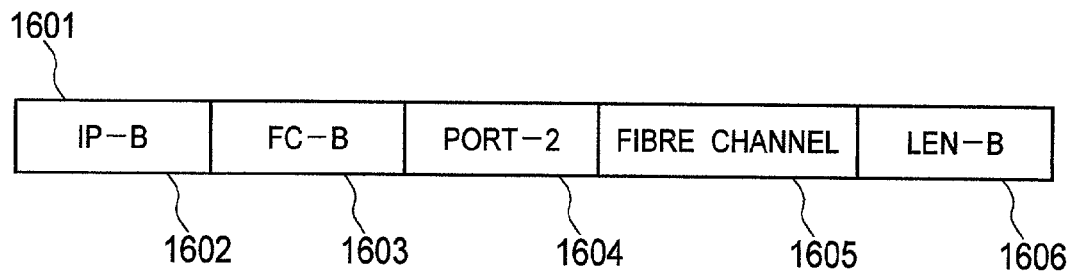
FIG. 15 is a diagram showing a content of a SAN transmission table of the SAN sending and conversion process section of a SAN sending process section shown in FIG. 13.

Referring to FIG. 14, there is shown a content (1501) of the destination information table (408) of the LAN receiving process section (309) shown in FIG. 13. The destination information table (1501) includes an IP address "IP-B" (1502), a transmission port No. "Port-2" (1503), and a transmission port attribute "Fibre Channel" (1504). Referring to FIG. 15, there is shown a content (1601) of the SAN transmission table (1204) of the SAN sending and conversion process section (901) of the SAN sending process section (306) shown in FIG. 13. The SAN transmission table (1601) includes a destination IP address "IP-B" (1602), a destination FC address "FC-B" (1603), a transmission port No. "Port-2" (1604), a transmission port attribute "Fibre Channel" (1605), and the maximum packet length "LEN-B (1606) which is the maximum packet length of the Fibre Channel (1412).

Figure 16:
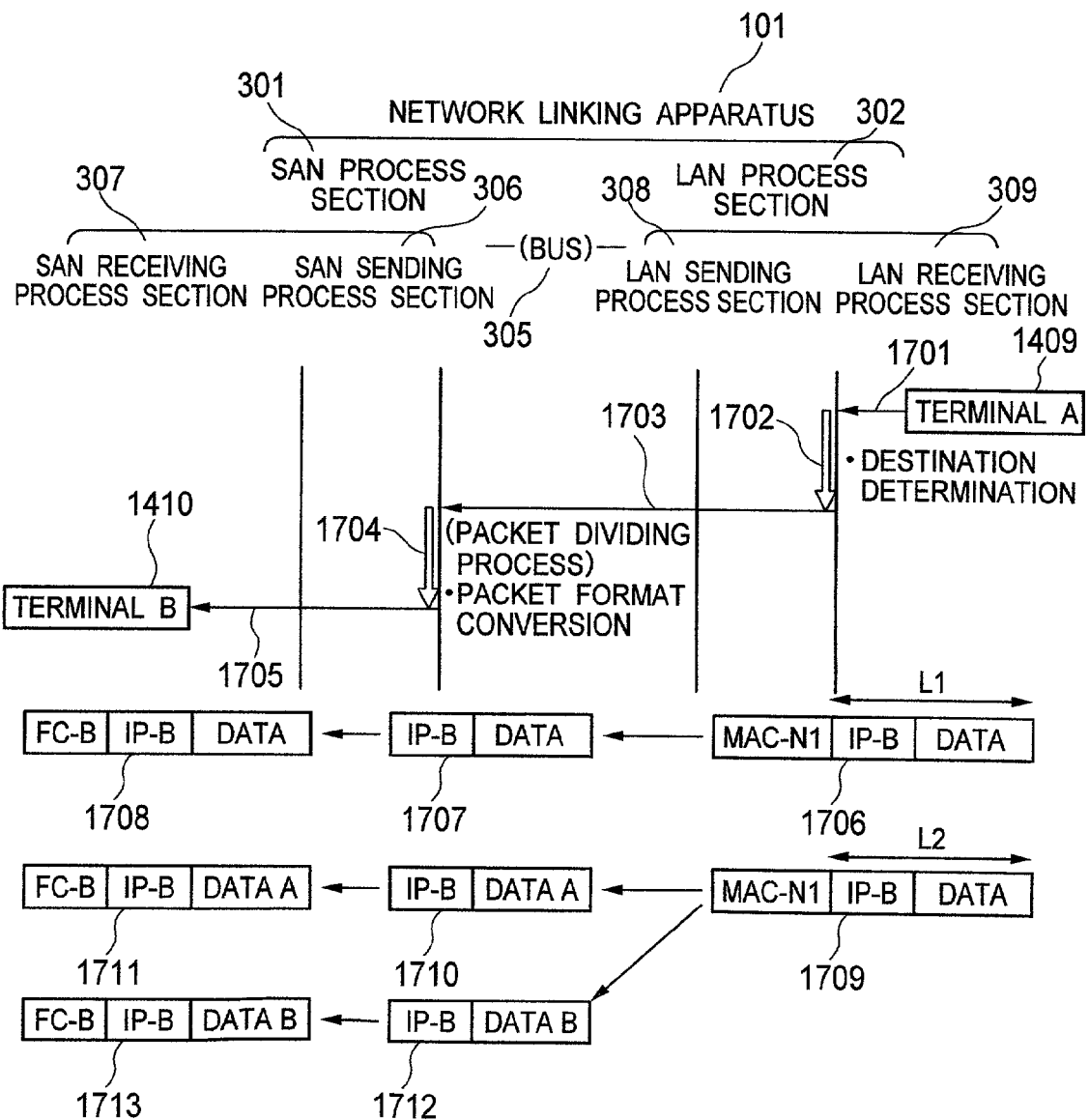
FIG. 16 is a diagram showing a processing flow of the network linking apparatus shown in FIG. 13.

By using FIG. 16, the following describes a processing flow of the network linking apparatus (101) when the terminal "A" (1409) sends a packet to the terminal "B" (1410).

The terminal "A" (1409) generates an Ethernet packet (1706) and sends (1701) it to the network linking apparatus (101) via the Ethernet (1411). The Ethernet packet (1706) includes "MAC-N1" set for the Port-1 (310) of the network connecting section (101) as the destination MAC address, and includes "IP-B" set for the terminal "B" as the destination IP address. The packet length L1 of the packet equals "(IP header length)+(data length)."

Receiving the Ethernet packet (1706) from the Ethernet (1411), the LAN process section (302) of the network linking apparatus (101) managing the Port-1 (310) passes the packet to the LAN receiving process section (309).

The destination determining section (406) of the LAN receiving process section (309) refers to the destination IP address "IP-B" included in the Ethernet packet (1706), and retrieves (1702) the destination IP address of the destination information table (1501). Finding an entry having a destination IP address matching "IP-B" as a result of the retrieval, it acquires "Port-2" (1503) which is a transmission port No. included in the entry. The SAN process section does not need the Ethernet header including "MAC-N1" as a destination MAC address in the Ethernet packet (1706). Therefore, the destination determining section (406) removes the Ethernet header from the Ethernet packet (1706). As a result, the Ethernet packet (1706) is put in a form of a packet (1707). The destination determining section (406) passes a packet (1707) to the packet relay section (407) in order to send the packet (1707) to the SAN process section (301) managing the Port-2 (311). The packet (1707) is sent from the packet relay section (407) to the SAN process section (301) via the bus (305).

Receiving the packet (1707) from the bus (305), the packet relay section (907) of the SAN process section (301) passes it to the SAN sending process section (306).

The SAN sending and conversion process section (901) of the SAN sending process section (306) receives the packet. The packet dividing section (1201) of the SAN sending and conversion process section (901) refers to the "IP-B" which is a destination IP address included in the packet (1707), and retrieves (1704) the destination IP address of the SAN transmission table (1601). Finding an entry having the destination IP address matching the "IP-B" as a result of the retrieval, it reads out "LEN-B" (1606) which is a value of the maximum packet length included in the entry, and compares it with a packet length L1 of the packet (1707). In this embodiment, the packet length L1 is assumed to be smaller than the "LEN-B" (1606). Therefore, the packet dividing section (1201) does not divide the packet (1707). The packet (1707) is sent from the packet dividing section (1201) to the packet format conversion section (1205).

The packet format conversion section (1205) refers to the "IP-B" which is a destination IP address included in the packet (1707), and retrieves the destination IP address of the SAN transmission table (1606). Finding an entry having a destination IP address matching the "IP-B" as a result of the retrieval, it reads out "FC-B" (1603) which is a value of the destination FC address included in the entry. Then, the packet format conversion section (1205) generates a FC header including the "FC-B" (1603), and adds it to the packet (1707) for a format conversion of the packet (1707). As a result, the packet (1707) becomes a FC packet (1708). The SAN sending and conversion process section (901) passes the converted FC packet (1708) to the FC sending process section (903). After completion of the required processing in the FC sending process section (903), the SAN sending process section sends (1705) the FC packet (1708) from the Port-2 (311) to the Fibre Channel (1412). The FC packet (1708) is sent to the terminal "B" (1410) via the Fibre Channel (1412).

The following section describes a flow of processes performed when the packet length L is greater than the "LEN-B" (1606) as a result of the comparison in the packet dividing section (1201).

Receiving a packet (1709) from which the Ethernet header is removed in the LAN receiving process section (309) from the bus (305), the packet relay section (907) of the SAN process section (301) passes it to the SAN sending process section (306).

The SAN sending and conversion process section (901) of the SAN sending process section (306) receives the packet (1709). The packet dividing section (1201) of the SAN sending and conversion process section (901) reads out the "LEN-B" (1606) from the SAN transmission table (1601), and then compares it with a packet length L2 of the packet (1709). Determining that the packet length L2 is greater than the "LEN-B" (1606) as a result, the packet dividing section (1201) divides data included in the packet (1709) into two pieces of data, data "A" and data "B". At this time, the packet (1709) and the divided data are temporarily stored in the division area (1202). The packet dividing section (1201) adds an IP header included in the packet (1709) to each of the divided data "A" and data "B" to generate a packet 1 (1710) and a packet 2 (1712). The respective packets are sent to the packet format conversion section (1205).

The packet format conversion section (1205) performs the same processes for the received packets to generate a FC packet 1 (1711) and a FC packet 2 (1713).

The SAN sending process section sends (1705) these FC packets from the Port-2 (311) to the Fiber Channel (1412).

While the original packet is divided into two packets in the above example, the packet dividing section (1201) may divide the original packet into three or more packets according to a length of the original packet.

The following describes a flow of processing of the network linking apparatus (101) performed when the terminal "B" (1410) sends a packet to the terminal "A" (1409).

Figure 17:
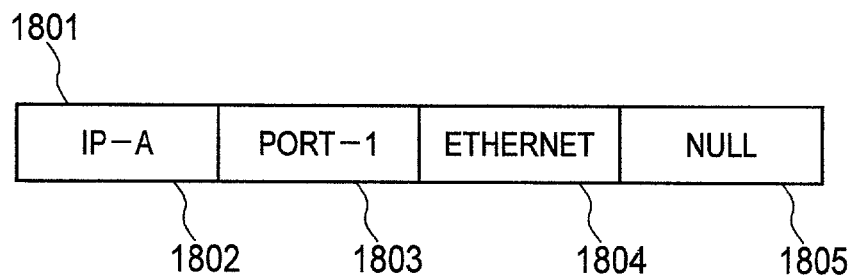
FIG. 17 is a diagram showing a content of an initial state of a packet conversion table of the SAN receiving and conversion process section of a SAN receiving process section shown in FIG. 13.

Referring to FIG. 17, there is shown a content (1801) of an initial state of a packet conversion table (1005) of the SAN receiving and conversion process section (904) of a SAN receiving process section (307) shown in FIG. 13. The packet conversion table (1801) in the initial state includes "IP-A" (1802) which is an IP address of the terminal "A" as a destination IP address, "Port-1" (1803) as a transmission port No., "Ethernet" (1804) as a transmission port attribute, and "NULL" (1805) as the maximum packet length defined for Ethernet (1804).

Figure 18:
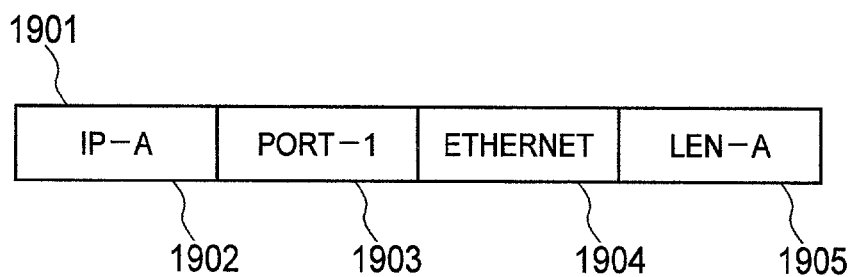
FIG. 18 is a diagram showing a content of a packet conversion table after the maximum packet length is set in the table.

Referring to FIG. 18, there is shown a content (1901) of a packet conversion table (1801) having a value of the maximum packet length, which is written into the packet conversion table (1801) shown in FIG. 17. In FIG. 18, the packet conversion table (1901) has "LEN-A" (1905) registered as the maximum packet length.

Figure 19:
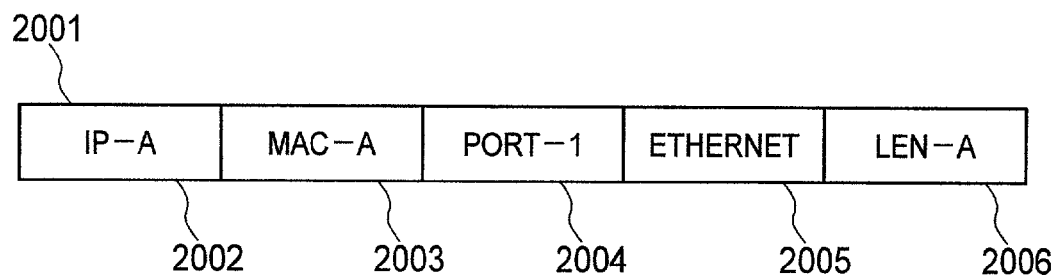
FIG. 19 is a diagram showing a content of the LAN transmission table of the LAN sending and conversion process section of the LAN sending process section shown in FIG. 13.

Referring to FIG. 19, there is shown a content (2001) of the LAN transmission table (703) of the LAN sending and conversion process section (403) of the LAN sending process section (308) shown in FIG. 13. The LAN transmission table (2001) includes "IP-A" (2002) as a destination IP address, "MAC-A" (2003) as a destination MAC address, "Port-1" (2004) as a transmission port No., "Ethernet" (2005) as a transmission port attribute, and "LEN-A" (2006) as the maximum packet length defined for Ethernet (2005).

Figure 21:
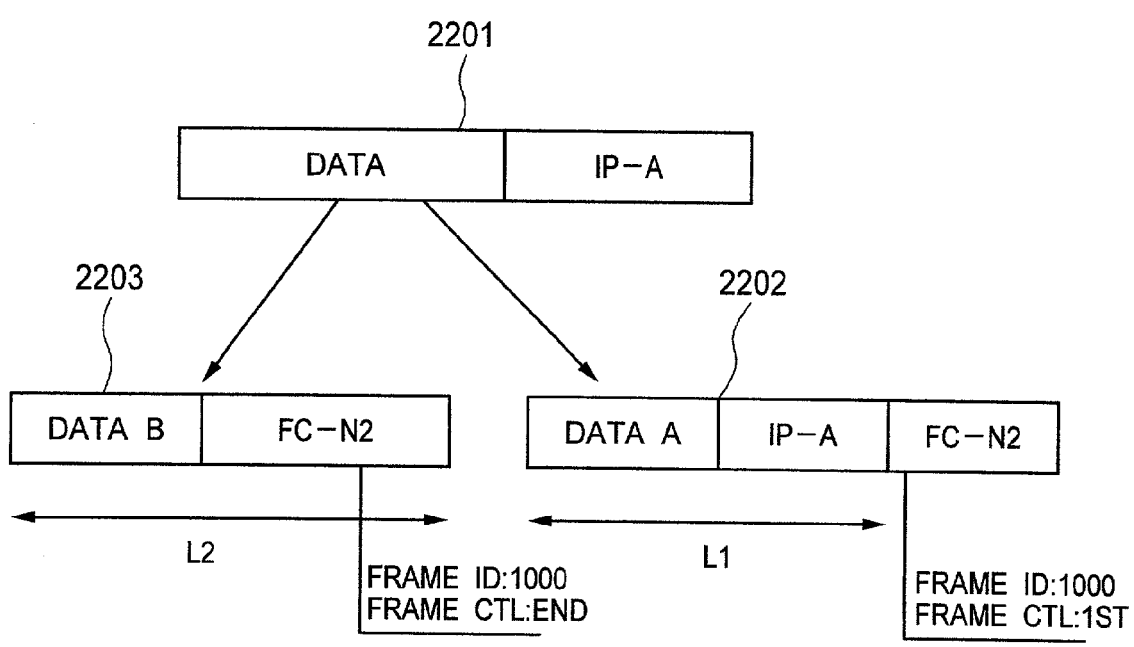
FIG. 21 is a diagram showing an example that an IP packet is divided into two FC packets in a terminal.

Referring to FIG. 21, there is shown an example that a packet (2201) generated by a process in the Layer 3 in the terminal "B" (1410) is divided into two FC packets by a process in the Layer 2. If a value of the packet (2201) length, "(IP header length)+(data length)" exceeds the maximum packet length defined for the Fibre Channel (304), the packet is divided into a plurality of FC packets. In this case, the entire packet including the IP header is treated as single data in the division. Therefore, the packet (2201) is divided into two pieces of data, an IP header plus data "A" and data "B". In FIG. 21, the IP header is described as IP-A. An FC header is added to each of the divided data to generate an FC packet 1 (2202) and an FC packet 2 (2203). In FIG. 21, an FC-N2 is entered in the FC header. The FC packet 1 (2202) is the first packet of the divided packets. Therefore, a value "1st" is set to the frame CTL included in the FC header of the FC packet 1 (2202). The FC packet 2 (2203) is the last packet of the divided packets. Therefore, a value of the frame CTL included in the FC header of the FC packet 2 (2203) is "END". A value of the frame ID included in the FC header of each FC packet is identical, and it is "1000" in this example.

Figure 22:
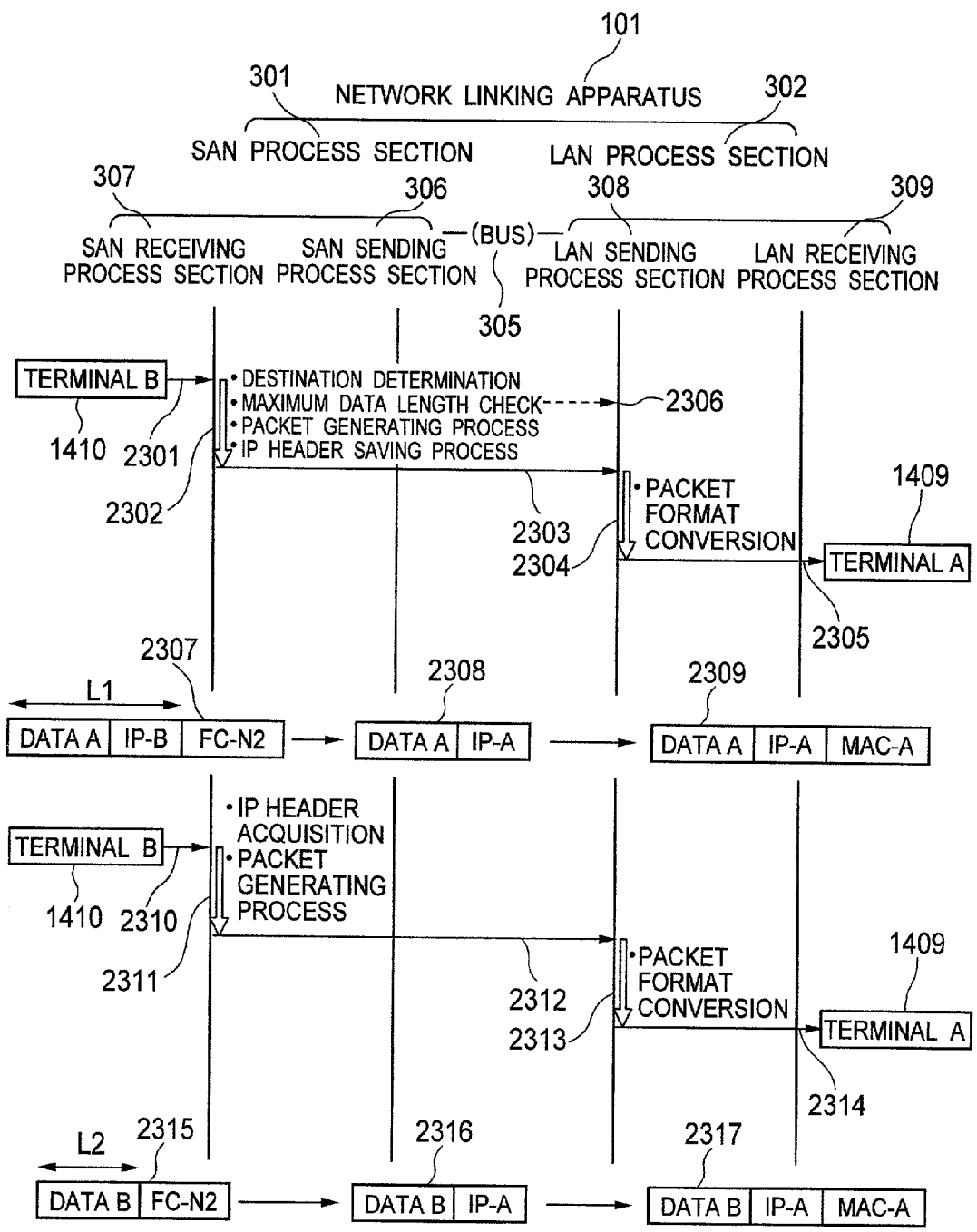
FIG. 22 is a diagram showing a processing flow of the network linking apparatus.

By using FIG. 22, the following describes a flow of processing of the network linking apparatus performed when the terminal "B" (1410) sends these FC packets to the terminal "A" (1409).

The terminal "B" (1410) generates a FC packet 1 (2307), and sends (2301) it to the network linking apparatus (101) via the Fiber Channel (1412). The FC packet 1 (2307) includes "FC-N2" set to the Port-2 (311) of the network linking apparatus (101) as a destination FC address, and "IP-A" set to the terminal "A" (1409) as a destination IP address. A packet length L1 of the FC packet 1 (2307) equals (IP header length)+(data "A" length).

Receiving the FC packet 1 (2307), the Port-2 (311) of the network linking apparatus (101) sends it to the SAN receiving process section (307). The FC packet 1 (2307) is passed from the FC receiving process section (906) of the SAN receiving process section (307) to the SAN receiving and conversion process section (904). The packet generating section (1001) of the SAN receiving and conversion process section (904) refers to a value of the frame CTL in the FC header of the FC packet 1 (2307), and determines whether the FC packet 1 (2307) is a divided packet. Since the value "1st" is set to the frame CTL included in the FC packet 1 (2307), the packet generating section (1001) determines that the FC packet 1 (2307) is the first packet of the packet which has been divided. Then, the packet generating section (1001) stores an IP header included in the FC packet 1 (2307) into the IP header save area (1004) together with the frame ID value "1000".

The packet generating section (1001) refers to the "IP-A" which is a destination IP address included in the IP header of the FC packet 1 (2307), and retrieves a destination IP address of the packet conversion table (1005). Finding an entry having a destination IP address matching the "IP-A" as a result of the retrieval, it reads out a value of the maximum packet length included in the entry, and compares it with the packet length L1 of the FC packet 1 (2307). The content of the packet conversion table (1005), however, is in an initial state as shown in FIG. 17. Therefore, a value of the maximum packet length is NULL (1805). Accordingly, the maximum packet length checking section (1002) checks the maximum packet length defined for the Ethernet (1411) which is a destination line. The maximum packet length checking section (1002) retrieves the LAN transmission table (703) of the LAN sending and conversion process section (403) by using as a key the "Port-1" which is the transmission port No. registered in the above entry of the packet conversion table (1005). As a result, the maximum packet length checking section (1002) reads out the maximum packet length value "LEN-A" (2006) registered in the entry having the destination port No. matching the "Port-1", and then writes it into the packet conversion table (1005). This causes the content of the packet conversion table to be as sown in FIG. 18. It is enough for the maximum packet length checking section (1002) to write the packet length value once for each destination port.

The packet generating section (1001) reads out the maximum packet length value "LEN-A" (1905) written by the maximum packet length checking section (1002), and compares it with the packet length L1 of the FC packet 1 (2307) to determine whether the packet dividing process should be performed. In this example, the packet length L1 of the FC packet 1 (2307) is assumed to be smaller than the "LEN-A" (1905), and therefore the packet generating section (1001) does not divide the packet. In addition, the FC header of the FC packet 1 (2307) is unnecessary, and therefore the packet generating section (1001) removes it from the FC packet 1 (2307). This causes the FC packet 1 (2307) to be a packet 1 (2308). The packet generating section (1001) sends the packet 1 (2308) to the destination determining section (1003).

Receiving the packet 1 (2308), the destination determining section (1003) reads the "IP-A" included in the IP header of the packet 1 (2308), and retrieves (2302) the destination IP address in the packet conversion table (1005). Finding an entry having a destination IP address matching the "IP-A" as a result of the retrieval, it reads out the transmission port No. value "Port-1" (1803) included in the entry. The destination determining section (1003) recognizes that the destination is the Port-1 (310), and passes the packet 1 (2308) to the packet relay section (907) in order to send it to the LAN process section (302). The packet relay section (907) sends the packet 1 (2308) to the LAN process section (302) via the bus (305).

The packet relay section (407) of the LAN process section (302) receives the packet 1 (2308), and sends it to the LAN sending process section (308). The LAN sending and conversion process section (403) of the LAN sending process section (308) receives the packet.

The packet dividing section (702) of the LAN sending and conversion process section (403) reads the "IP-A" included in the IP header of the packet 1 (2308), and retrieves (2304) the LAN transmission table (703). Finding an entry in which the "IP-A" is registered, as a result of the retrieval, it reads out the "LEN-A" (2006) which is a value of the maximum packet length registered in the entry, and compares it with the packet length L1 of the packet 1 (2308) to determine whether the packet dividing process should be performed. The packet length L1 of the packet 1 (2308) is determined to be smaller than the "LEN-A" by the SAN receiving process section (307), thereby causing no dividing process at this time. If the packet length L1 is greater than the "LEN-A" value, the SAN receiving process section (307) divides the packet. The packet dividing section (702) determines that the packet 1 (2308) should not be divided, and then sends the packet 1 (2308) to the packet format conversion section (701).

Receiving the packet 1 (2308), the packet format conversion section (701) retrieves the LAN transmission table (703) to find an entry having the "IP-A" included in the IP header of the packet 1 (2308). The packet format conversion section (701) reads out "MAC-A" (2003) which is a value of the destination MAC address registered in the entry. The packet format conversion section (701) generates an Ethernet header including the read "MAC-A", and adds the generated Ethernet header to the packet 1. This conversion process causes the packet 1 (2308) to be an Ethernet packet 1 (2309). The LAN sending and conversion process section (403) passes the converted Ethernet packet 1 (2309) to the Ether sending process section (402). After completion of necessary processes in the Ether sending process section (402), the LAN sending process section (403) sends (2305) the Ethernet packet 1 (2309) from the Port-1 (31) to the Ethernet (1411). The Ethernet packet 1 (2309) is sent to the terminal "A" (1409) via the Ethernet (1411).

On the other hand, the terminal "B" (1410) generates and sends (2310) a FC packet 2 (2315) subsequently to the FC packet 1 (2307). The FC packet 2 (2315) is the last packet of the divided packets as described by using FIG. 21. The FC packet 2 (2315) includes "FC-N2" set to the Port-2 (1414) of the network linking apparatus (101) as a destination FC address. In addition, the packet length L2 is the same as the length of the data "B".

Receiving the FC packet 2 (2315), the Port-1 (310) of the network linking apparatus (101) sends it to the SAN receiving process section (307). The FC packet 2 (2315) is passed from the FC receiving process section (906) of the SAN receiving process section (307) to the SAN receiving and conversion process section (904).

The packet generating section (1001) of the SAN receiving and conversion process section (904) refers to a value of the frame CTL in the FC header of the FC packet 2 (2315), and determined whether the FC packet 2 (2315) is a divided packet. Due to "END" of the frame CTL value included in the FC packet 2 (2315), the packet generating section (1001) determines that the FC packet 2 (2315) is the last packet of the original packet having been divided. The packet generating section (1001) refers to a frame ID value "1000" in the FC header of the FC packet 2 (2315), and retrieves the IP header save area (1004). In the IP header save area (1004), an IP header has already been saved together with the frame ID "1000". Therefore, the packet generating section (1001) reads out the IP header, and adds it to the FC packet 2 (2315).

In addition, the packet generating section (1001) refers to "IP-A" which is a destination IP address included in the IP header added to the FC packet 2 (2315), and retrieves the packet conversion table (1005). Finding an entry having the destination IP address matching the "IP-A", as a result of the retrieval, it reads out the maximum packet length value "LEN-A" (1905) included in the entry. The packet generating section (100) compares a value of a length of the data "B" in the FC packet 2 (2315) plus a length of the added IP header with the "LEN-A" value to determine whether the packet should be divided. In this example, the length of the FC packet 2 (2315) is assumed to be smaller than the "LEN-A" value, and therefore the packet generating section (1001) determines that the packet should not be divided. The FC header of the FC packet 2 (2315) is unnecessary, and therefore the packet generating section (1001) removes it from the FC packet 2 (2315). This causes the FC packet 2 (2315) to be a packet 2 (2316). The packet generating section (1001) sends the packet 2 (2316) to the destination determining section (1003).

Receiving the packet 2 (2316), the destination determining section (1003) reads the "IP-A" included in the IP header of the packet 2 (2316), and retrieves the packet conversion table (2311). The destination determining section (1003) reads out a value of the transmission port No., "Port-1" (1803) included in the entry from the entry in which the "IP-A" is registered. The destination determining section (1003) recognizes the Port-1 (310) as a destination, and passes the packet 2 (2316) to the packet relay section (907) in order to send it to the LAN process section (302). The packet relay section (907) sends (2312) the packet 2 (2316) to the LAN process section (302) via the bus (305).

The packet relay section (407) of the LAN process section (302) receives the packet 2 (2316), and sends it to the LAN sending process section (308). The LAN sending and conversion process section (403) of the LAN sending process section (308) receives the packet 2 (2316).

The packet dividing section (702) of the LAN sending and conversion process section (403) reads the "IP-A" included in the IP header of the packet 2 (2316), and retrieves (2313) the LAN transmission table (703). The packet dividing section (702) reads out the "LEN-A" (2006) which is a value of the maximum packet length registered in an entry in which the "IP-A" is registered, and compares it with a packet length of the packet 2 (2316) to determine whether the packet dividing process should be performed. Since the SAN receiving process section (307) has determined that the packet length of the packet 2 (2316) is smaller than the "LEN-A," the packet dividing section (702) determines that the packet 2 (2316) should not be divided, and then sends the packet 2 (2316) to the packet format conversion section (701).

Receiving the packet 2 (2316), the packet format conversion section (701) retrieves the LAN transmission table (703) to find an entry having the "IP-A" included in the IP header of the packet 2 (2316). The packet format conversion section (701) reads out "MAC-A" (2003) which is a value of the destination MAC address registered in the entry. The packet format conversion section (701) generates an Ethernet header including the read "MAC-A", and adds the generated Ethernet header to the packet 2 (2316). This causes the packet 2 (2316) to be an Ethernet packet 2 (2317). The LAN sending and conversion process section (403) passes the converted Ethernet packet 2 (2317) to the Ether sending process section (402). After completion of necessary processes in the Ether sending process section (402), the LAN sending process section (403) sends (2314) the Ethernet packet 2 (2317) to the Ethernet (1411) from the Port01 (310). The Ethernet packet 2 (2317) is sent to the terminal "A" (1409) via the Ethernet (1411).

Figure 23:
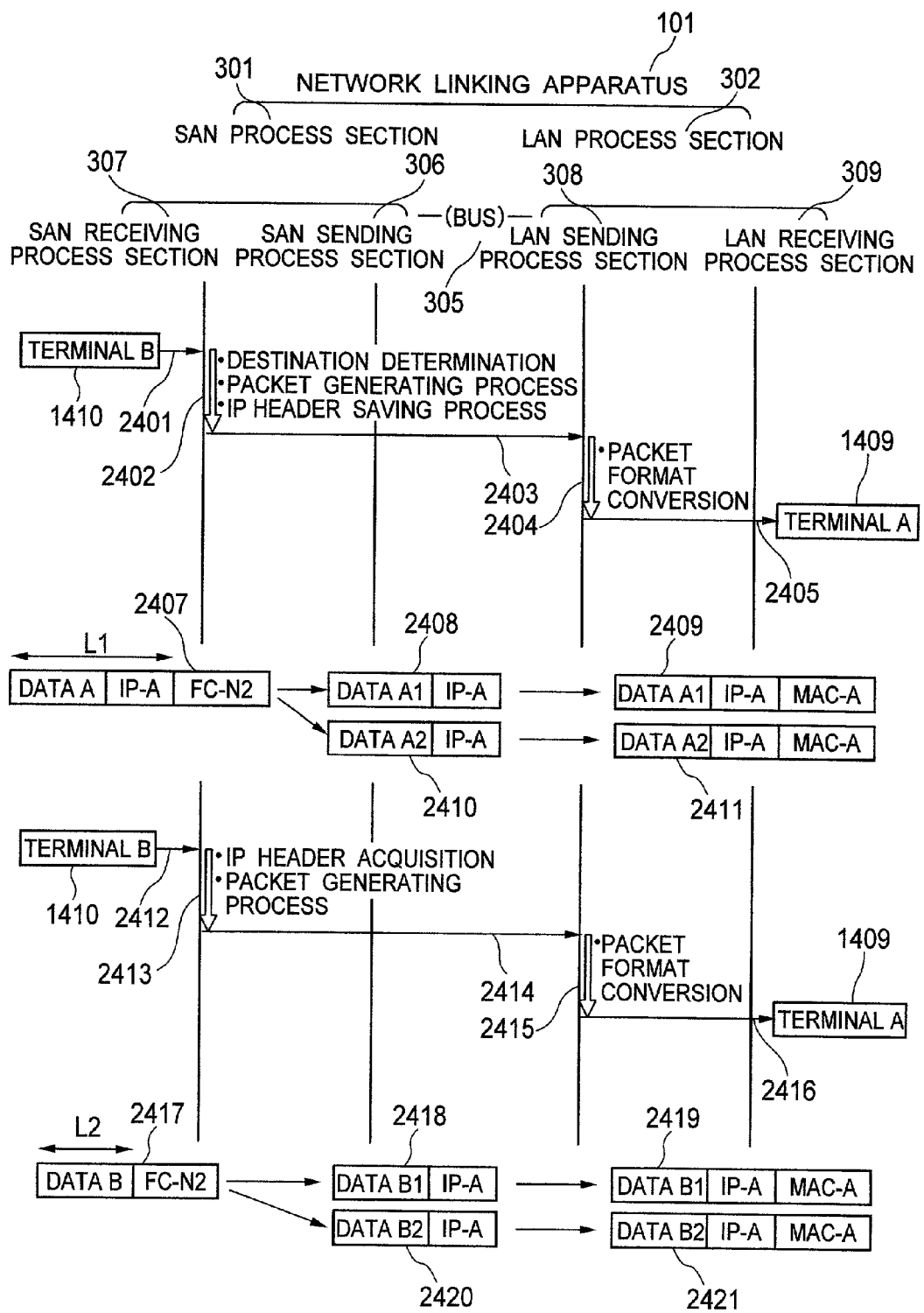
FIG. 23 is a diagram showing a processing flow of the network linking apparatus.

By using FIG. 23, the following describes a flow of processing of the network linking apparatus performed when a packet sent from the terminal "B" (1410) to the terminal "A" (1409) is longer than the maximum packet length defined for the Ethernet (1411).

The terminal "B" (1410) generates and sends (2401) a FC packet 1 (2407). The FC packet 1 (2407) includes "FC-N2" set for the Port-2 (311) of the network linking apparatus (101) as a destination FC address, and "IP-A" set for the terminal "A" (1409) as a destination IP address. The packet length L1 of the FC packet 1 (2407) equals an IP header length plus a data "A" length.

Receiving the FC packet 1 (2407), the Port-2 (311) of the network linking apparatus (101) sends it to the SAN receiving process section (307). The FC packet 1 (2407) is passed from the FC receiving process section (906) of the SAN receiving process section (307) to the SAN receiving and conversion process section (904). The packet generating section (1001) of the SAN receiving and conversion process section (904) refers to a value of a frame CTL in a FC header of the FC packet 1 (2407), and determines whether the FC packet 1 (2407) is a divided packet. Due to the value "1st" of the frame CTL included in the FC packet 1 (2407), the packet generating section (1001) determines that the FC packet 1 (2407) is the first packet of the packets into which the original packet has been divided. Then, the packet generating section (1001) stores an IP header included in the FC packet 1 (2407) into the IP header save area (1004) together with the frame ID value "1000".

Further, the packet generating section (1001) refers to "IP-A" which is a destination IP address included in the IP header of the FC packet 1 (2407), and retrieves the packet conversion table (1005). Finding an entry in which the "IP-A" is registered, the packet generating section (1001) reads out a value of the maximum packet length "LEN-A" (1905) included in the entry. Since the packet length L1 is greater than the "LEN-A" in this example, the packet generating section (1001) compares the "LEN-A" with the packet length L1 of the FC packet 1 (2407), and determines that the packet need be divided. The packet generating section (1001) divides the data "A" included in the FC packet 1 (2407) into data A1 and data A2. At this point, the FC packet 1 (2407) and the divided data are temporarily stored into the division area (1006). The packet generating section (1001) adds the IP header included in the FC packet 1 (2407) to each of the data A1 and the data A2 to generate a packet 11 (2408) and a packet 12 (2410). The FC header is unnecessary, and therefore the packet generating section (1001) removes it from the FC packet 1 (2407). The packet generating section (1001) sends the generated respective packets to the destination determining section (1003).

Receiving the packet 11 (2408) and the packet 12 (2410), the destination determining section (1003) performs the same processes as those described by using FIG. 22 for the respective packets, and then sends (2303) the packets to the LAN process section (302) via the bus (305).

The packet relay section (407) of the LAN process section (302) receives the respective packets, and sends them to the LAN sending process section (308). The LAN sending and conversion process section (403) of the LAN sending process section (308) receives the respective packets.

The LAN sending and conversion process section (403) also performs the same processes as those described by using FIG. 22 for the respective packets, and generates an Ethernet packet 11 (2409) and an Ethernet packet 12 (2411). Then, the LAN sending process section (403) sends (2405) the respective Ethernet packets from the Port-1 (310) to the Ethernet (1411).

On the other hand, the terminal "B" (1410) generates and sends (2412) a FC packet 2 (2417) subsequently to the FC packet 2 (2407). The FC packet 2 (2417) is the last packet of the packets into which the original packet has been divided in the terminal "B" (1410). The FC packet 2 (2417) includes "FC-N2" set for the Port-2 (1414) of the network linking apparatus (101) as a destination FC address. In addition, the packet length L2 is the same as the length of the data "B".

Receiving the FC packet 2 (2417), the Port-1 (310) of the network linking apparatus (101) sends it to the SAN receiving process section (307). The FC packet 2 (2417) is passed from the FC receiving process section (906) of the SAN receiving process section (307) to the SAN receiving and conversion process section (904).

The packet generating section (1001) of the SAN receiving and conversion process section (904) refers to a value of a frame CTL in a FC header of the FC packet 2 (2417), and determines whether the FC packet 2 (2417) is a divided packet. Due to "END" of the frame CTL value included in the FC packet 2 (2417), the packet generating section (1001) determines that the FC packet 2 (2417) is the last packet of the packets into which the original packet has been divided. The packet generating section (1001) refers to the frame ID value "1000" in the FC header of the FC packet 2 (2417), and retrieves the IP header save area (1004). In the IP header save area (1004), an IP header has already been stored together with the frame ID "1000". Therefore, the packet generating section (1001) reads out the IP header, and adds it to the FC packet 2 (2417).

In addition, the packet generating section (1001) refers to "IP-A" which is a destination IP address included in the IP header added to the FC packet 2 (2417), and retrieves the packet conversion table (1005). The packet generating section (1001) finds an entry in which the "IP-A" is registered, and reads out the maximum packet length value "LEN-A" (1905) from the entry. The packet generating section (1001) compares the length of the data "B" of the FC packet 2 (2417) plus the length of the added IP header with the "LEN-A" value. In this example, the length of the data "B" plus that of the IP header is greater than the "LEN-A" value, and therefore the packet generating section (1001) determines that the packet need be divided. The packet generating section (1001) divides the data "B" included in the FC packet 2 (2417) into data B1 and data B2. At this point, the FC packet 2 (2417) and the divided data are temporarily stored in the division area (1006). The packet generating section (1001) adds the IP header read from the IP header save area (1004) to each of the data B1 and the data B2 to generate a packet 21 (2418) and a packet 22 (2420). The FC header is unnecessary, and therefore the packet generating section (1001) previously removes it from the FC packet 2 (2417). The packet generating section (1001) sends the respective packets to the destination determining section (1003).

Receiving the packet 21 (2418) and the packet 22 (2420), the destination determining section (1003) performs the same processes as those described by using FIG. 22 for the respective packets, and sends (2303) them to the LAN process section (302) via the bus (305).

The packet relay section (407) of the LAN process section (302) receives the respective packets, and sends them to the LAN sending process section (308). The LAN sending and conversion process section (403) of the LAN sending process section (308) receives the packets.

The LAN sending and conversion process section (403) also performs the same processes as those described by using FIG. 22 for the respective packets, and generates an Ethernet packet 21 (2419) and an Ethernet packet 22 (2421). Then, the LAN sending process section (403) sends (2405) the Ethernet packets from the Port-1 (310) to the Ethernet (1411).

Figure 24:
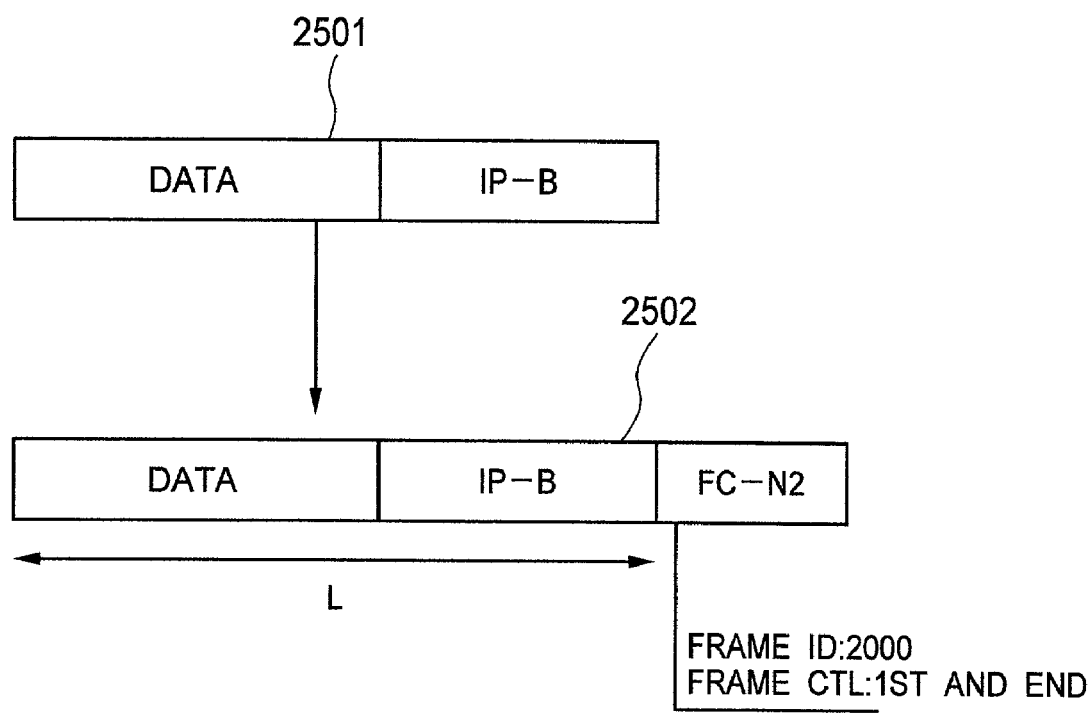
FIG. 24 is a diagram showing an example that an IP packet is not divided, but converted to a FC packet in a terminal.

In the examples shown in FIGS. 22 and 23, the packet generated by the terminal "B" (1410) is previously divided into a plurality of FC packets before a transmission. Naturally, however, there are some cases where the packet generated by the terminal "B" (1410) is not divided into a plurality of FC packets before a transmission. Referring to FIG. 24, there is shown an example where a packet (2501) generated in a process of the Layer 3 in the terminal "B" (1410) is converted directly to a FC packet (2502) in a process of the Layer 2. In this condition, a value of a frame CTL included in a FC header of the FC packet (2502) is "1st/END".

Figure 25:
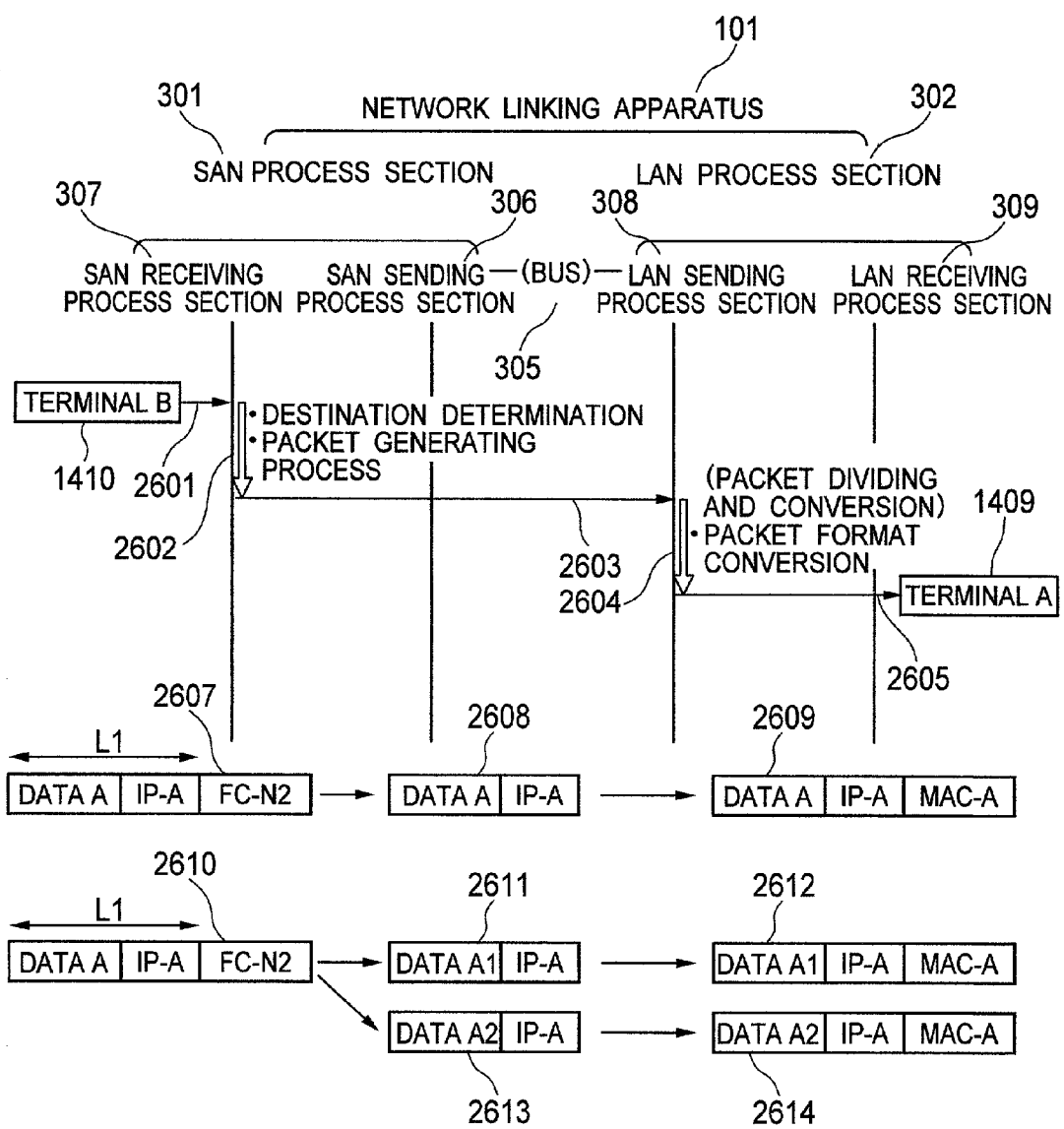
FIG. 25 is a diagram showing a processing flow of the network linking apparatus.

By using FIG. 25, the following describes a flow of processing of the network linking apparatus performed when this FC packet is sent from the terminal "B" (1410).

The terminal "B" (1410) generates and sends (2601) an FC packet (2607). The FC packet (2607) includes "FC-N2" set for the Port-2 (311) of the network linking apparatus (101) as a destination FC address, and "IP-A" set for the terminal "A" (1409) as a destination IP address. A packet length L of the FC packet (2607) is smaller than the maximum packet length defined for the Ethernet.

When the network linking apparatus (101) receives this FC packet at the Port-2 (311), the SAN receiving process section (307) and the LAN sending process section (308) execute the same processes as those described by using FIG. 22, and generate an Ethernet packet (2609). This Ethernet packet is sent (2605) from the Port-1 (310) to an Ethernet (1411).

On the other hand, in some cases the terminal "B" (1410) sends an FC packet (2610) longer in the packet length L than the maximum packet length defined for the Ethernet. In this case, the SAN receiving process section (307) and the LAN sending process section (308) of the network linking apparatus (101) execute the same processes as those described by using FIG. 23, and generate an Ethernet packet 1 (2612) and an Ethernet packet 2 (2614). Subsequently, the respective Ethernet packets are sent from the Port-1 (310) to the Ethernet (1411).

In the examples shown in FIGS. 22 and 23, the packet is divided into two FC packets by the terminal "B" (1410). Naturally, however, there are some cases where the packet is divided into three or more FC packets by the terminal "B" (1410). In this condition, a value "1st" is set to a frame CTL included in an FC header of the first (head) FC packet. A value "NULL" is set to a frame CTL included in an FC header of the second to (N−1)th FC packets. The "NULL" value means that the packet is neither the first packet nor the last packet of the divided packets. A value of a frame CTL included in an FC header of the Nth (last) FC packet is "END". Processes of the packet generating section (1001) for the FC packets including "NULL" as the frame CTL are the same as those for the FC packet including "END" as the frame CTL.

Figure 26:
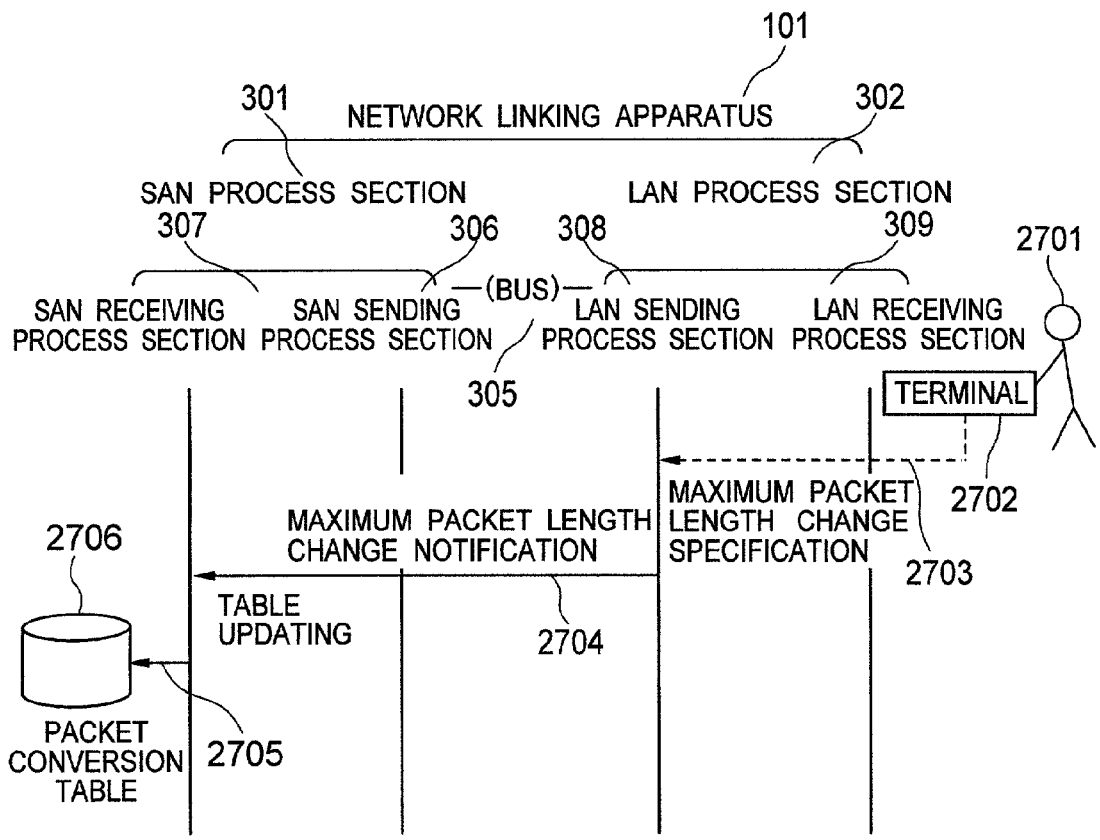
FIG. 26 is a diagram showing a processing flow of the network linking apparatus with the maximum packet length updated.

By using FIG. 26, the following describes a flow of processing of the network linking apparatus (101) performed when a change is made for a value of the maximum packet length defined for one of the communication lines.

A network operator (2701) can change the maximum packet length defined for the communication lines by using a terminal (2702) or the like. For this change, the operator can make the maximum packet length both longer (for example, Jumbo Frame) and shorter (for example, if a performance of a relay device is low). The network operator (2701) specifies a change of the maximum packet length defined for one of the communication lines by using the terminal (2702). At this time, the network operator (2701) specifies a value of the port No. corresponding to the communication line, and a value of the new maximum packet length. The specification of changing the maximum packet length reaches (2703) the LAN sending and conversion process section (405) of the network linking apparatus (101). The LAN sending and conversion process section (405) which has received the change specification extracts from the LAN transmission table (703) the entries in which the value of the specified port No. is registered, and updates the value of the maximum packet length registered in them to a specified value.

Figure 27:
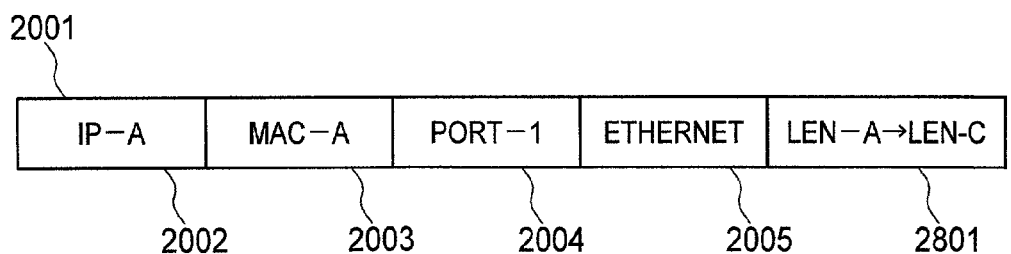
FIG. 27 is a diagram showing an example of entries to be updated in the LAN transmission table.

For example, the network operator (2701) specifies "Port-1" as a value of the port No., and "LEN-C" as a value of the maximum packet length. For this example, there is shown an example of an entry to be updated in the LAN transmission table in FIG. 27. As shown in FIG. 27, a value of the maximum packet length (2801) included in the entry (2001) in which the "Port-1" is registered is updated from "LEN-A" to "LEN-C".

If the maximum packet length registered in the LAN transmission table (703) is updated, the maximum packet length change notifying section (704) of the LAN sending and conversion process section (405) notifies the SAN receiving and conversion process section (904) of the SAN receiving process section (307) of a change of the maximum packet length (2704). This change notification includes a value of the port No. and a value of the maximum packet length which are specified by the network operator (2701). The maximum packet length checking section (1002) of the SAN receiving and conversion process section (904) notified of the change extracts entries in which the value of the specified port No. is registered in the packet conversion table (1005), and updates the value of the maximum packet length registered in them (2705). The change notification need not include the above information. In this example, the maximum packet length checking section (1002) notified of the change reads out the value of the updated maximum packet length and the value of the port No. from the LAN transmission table (703), and updates the value of the maximum packet length registered in the corresponding entries in the packet conversion table (1005).

Figure 28:
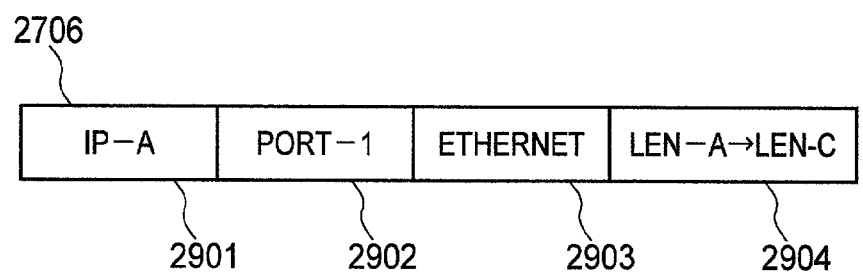
FIG. 28 is a diagram showing an example of entries to be updated in the packet conversion table.
Figure 29:
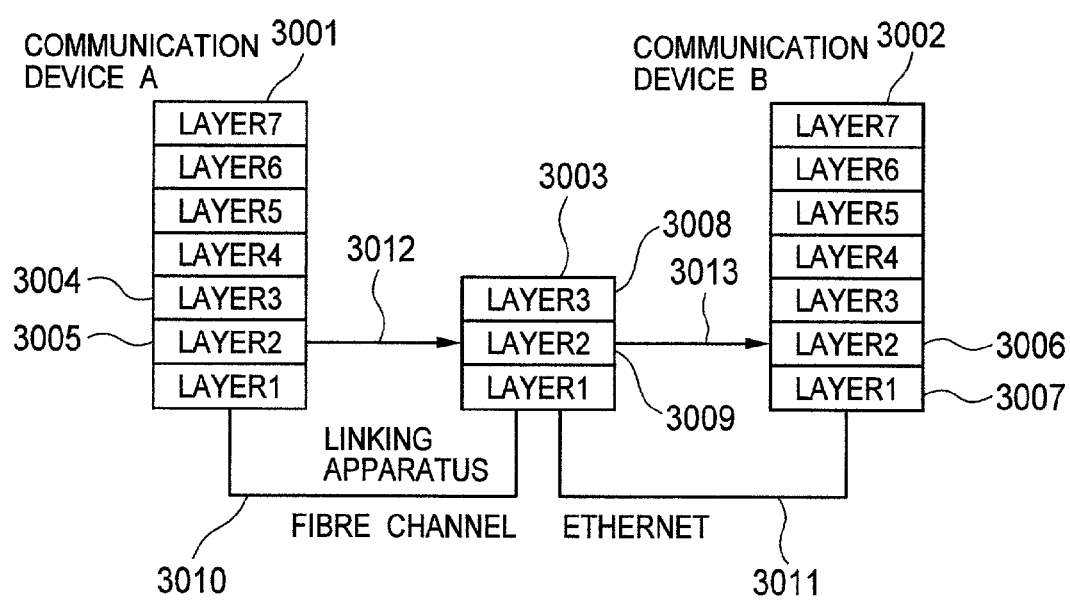
FIG. 29 is a diagram showing a network system comprising a communication device and a linking apparatus.
Figure 30:
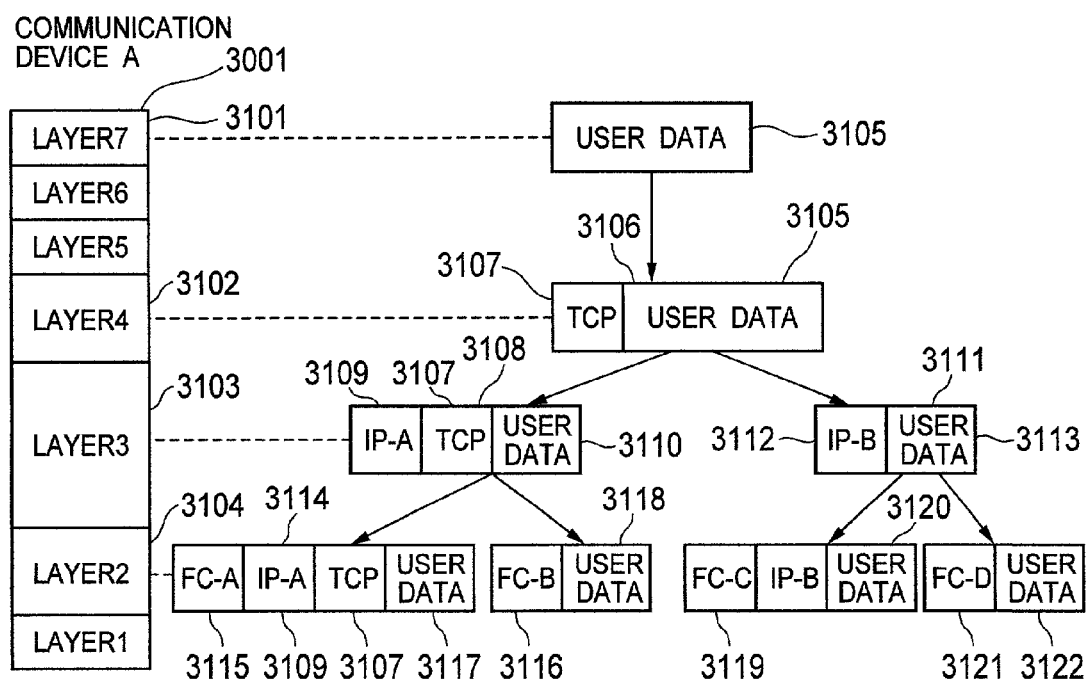
FIG. 30 is a diagram showing a flow of a sending process of the communication device A shown in FIG. 29.
Figure 31:
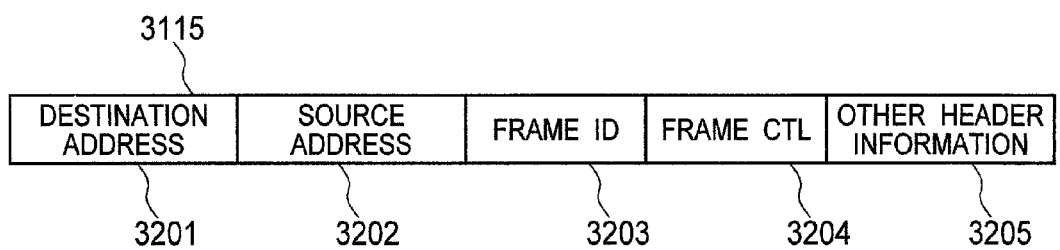
FIG. 31 is a diagram showing a FC header structure.
Figures 32, 33:
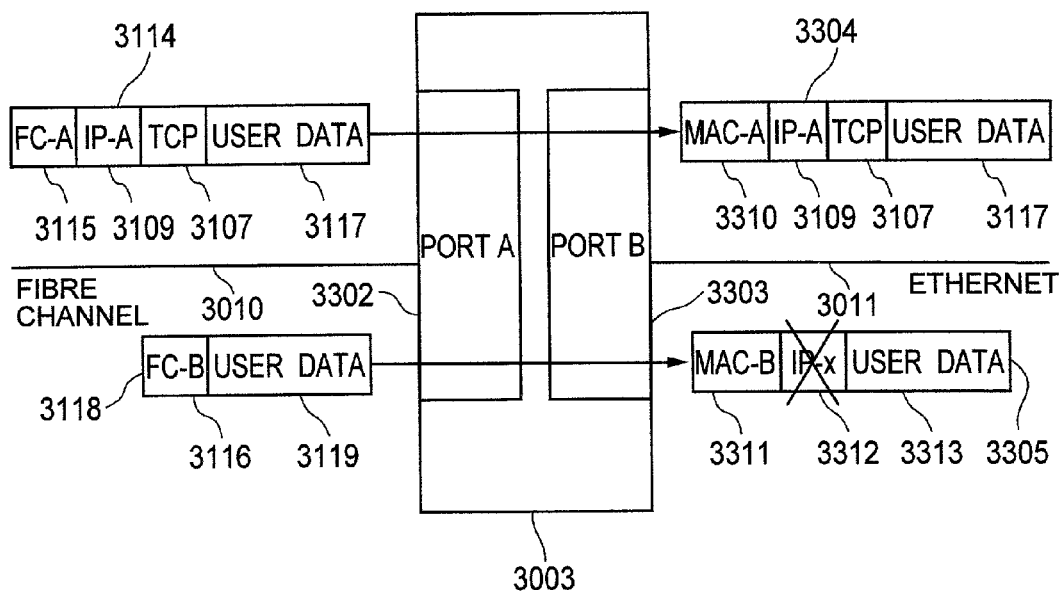
FIG. 32 is a diagram showing a condition of packet relay process performed by the linking apparatus shown in FIG. 29.
FIG. 33 is a diagram showing a structure of a relay table of the linking apparatus shown in FIG. 29.
Figure 34:
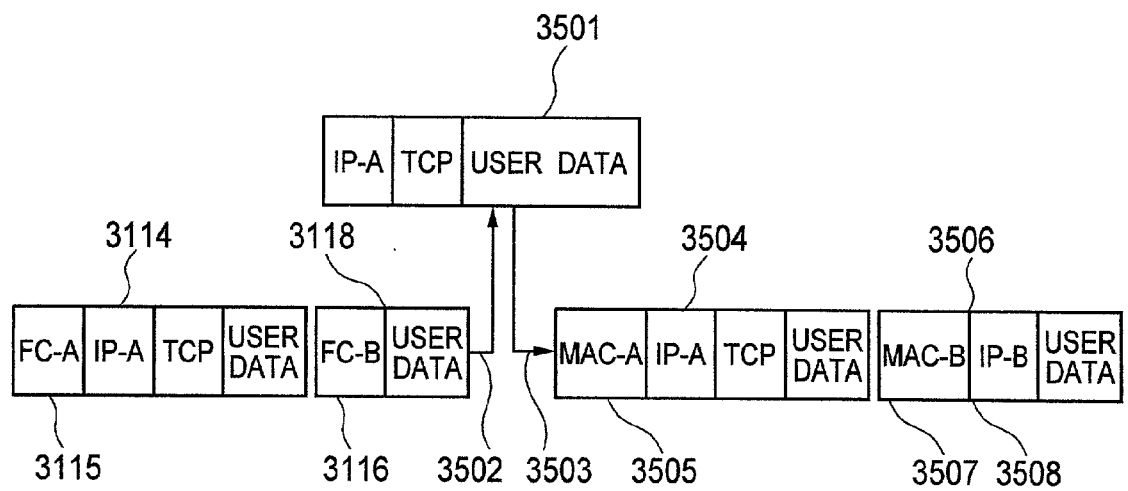
FIG. 34 is a diagram showing an example that the linking apparatus shown in FIG. 29 reconstructs packets and divides it again.

Referring to FIG. 28, there is shown an example of an entry to be updated in the packet conversion table. As shown in FIG. 28, a value of the maximum packet length included in an entry (2706) in which the "Port-1" is registered is updated from "LEN-A" to "LEN-C".

In the example shown in FIG. 26, the network operator (2701) manually sets the maximum packet length. There is no problem, however, that the maximum packet length is automatically set by using a network protocol (for example, Path MTU Discovery). If so, the LAN transmission table is automatically updated by using the network protocol. Then, the maximum packet length change notifying section detects the updating and notifies the maximum packet length checking section (1002) of the SAN receiving and conversion process section (904) of the change.

The following describes another sample configuration of the network linking apparatus.

Figure 35:
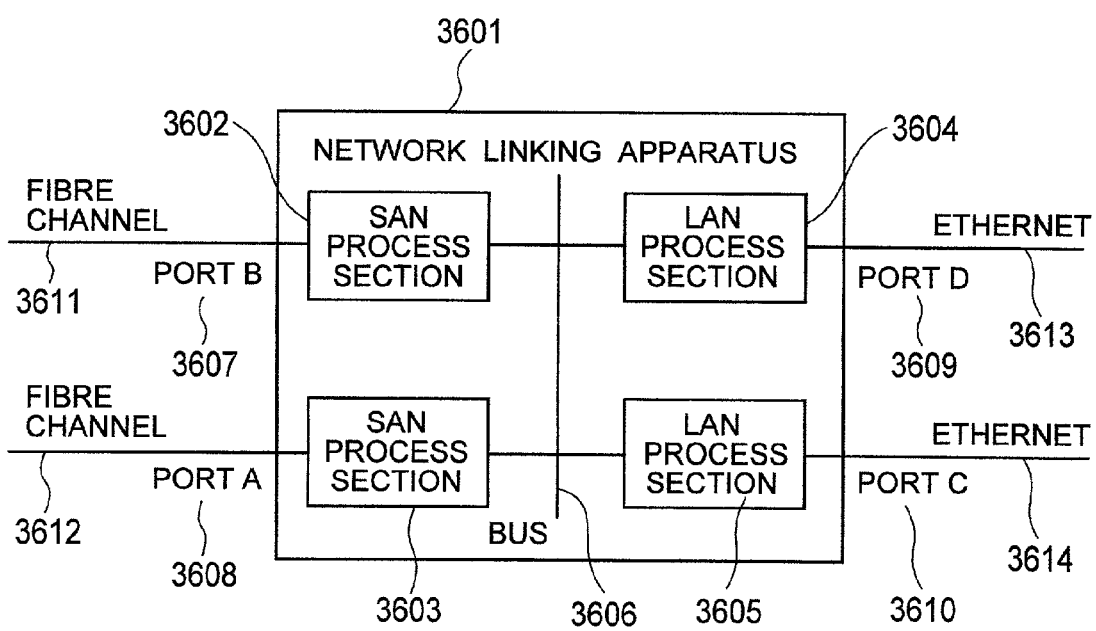
FIG. 35 is a diagram showing another sample configuration of a network linking apparatus.
Figure 36:
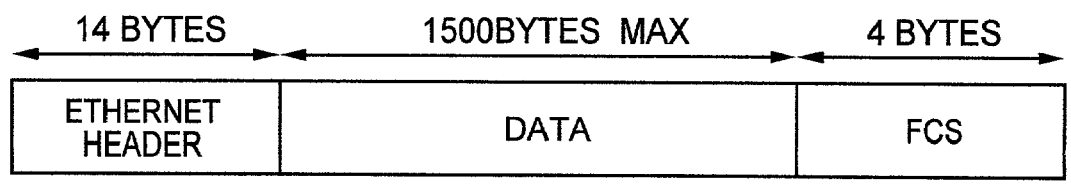
FIG. 36 is a diagram showing a format of a packet communicated in Ethernet.
Figure 37:
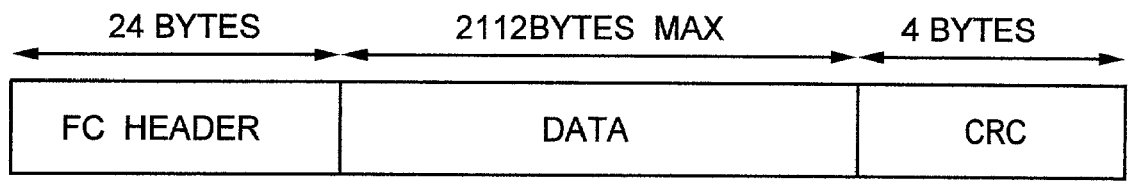
FIG. 37 is a diagram showing a format of a packet communicated in Fibre Channel.

Referring to FIG. 35, there is shown another sample configuration of the network linking apparatus. In FIG. 35, the network linking apparatus (3601) includes a Port "A" (3608) and a Port "B" (3607) which are connected to two Fibre Channel lines (3611) and (3612), respectively. In addition, the network linking apparatus (3601) includes a Port "C" (3610) and a Port "D" (3609) which are connected to two Ethernet lines (3613) and (3614), respectively. Furthermore, the network linking apparatus (3601) includes two SAN process sections (3602) and (3603) which correspond to the Port "A" (3608) and the Port "B" (3607), respectively, and two LAN process sections (3604) and (3605) which correspond to the Port "C" (3610) and the Port "D" (3609), respectively. The SAN process sections and the LAN process sections are connected to a bus (3606). The SAN process sections and the LAN process sections operate in the same manner as for those described in the above. According to this arrangement, the network linking apparatus (3601) can relay packets both between Fibre Channel lines and between Ethernet lines. As for the number of ports, three or more ports can be connected to the Fibre Channel lines or the Ethernet lines.

In the above embodiment, the descriptions are made on the assumption that the LAN physical network is the Ethernet line and the SAN physical network is the Fibre Channel line. Another type of physical network, however, can be used only if it has the same specifications.

The Layer 3 protocol is described as an IP protocol in the above embodiment. Another type of Layer 3 protocol, however, can be used only if mutual connectivity can be secured.

According to the above embodiment, there is no need for reconstructing respective packets received from one network in a packet relay between the SAN and the LAN. Therefore, the packets can be relayed efficiently and at a higher speed.

As set forth hereinabove, according to the present invention, a packet sent from one network can be relayed to the other network more efficiently and at a higher speed in a packet relay between two networks using different types of lines.

It should be further understood by those skilled in the art that the foregoing description has been made on embodiments of the invention and that various changes and modifications may be made in the invention without departing from the spirit of the invention and scope of the appended claims.

What is claimed is:

1. A linking apparatus which is connected to first and second networks of different line protocols for communication lines, and performs a packet relay between said first and second networks, comprising:
  a first port connected to said first network for receiving a first packet from said first network, said first packet including two kinds of packets such that one kind of packet includes a first header of a line protocol of a higher layer than said line protocols of said first and second networks, a second header of the protocol of said first network, packet identification information and user data, the other kind of packet includes said second header, said packet identification information and said user data, but does not include said first header, the latter packet that includes no first header is a packet of a plurality of packets divided from one packet, said packet identification information being information having a same value for the packets divided from a same packet so as to provide information for determining whether packets are divided from a same packet or not;
  a second port connected to said second network for sending a second packet to said second network;
  a receiving section connected to said first port, said receiving section including a memory section storing at least one first header with being associated with packet identification information, determining whether said first packet includes the first header, and when the first header is included, storing in said memory section said packet identification information and first header of said first packet with said packet identification information and first header being associated with each other and outputting said first packet, and when the first header is not included, reading out from said memory section a first header, which is stored with being associated with a packet identification information having a same value as for the packet identification information included in said first packet, among the first headers stored in said memory section to output said first packet to which said read-out first header is added; and a sending section connected to said second port and said receiving section, said sending section receiving said first packet output from said receiving section, converting said first packet to said second packet, and outputting said second packet to said second port, said sending section adding a third header of the line protocol of said second network to said second packet based on the first header added to said first packet.

2. The linking apparatus according to claim 1, wherein said receiving section determines whether a packet length of said first packet to which said first header is added is greater than a value of a maximum packet length defined for said second network, and when the packet length of said first packet is greater than the value of said maximum packet length, divides said first packet to two or more third packets to output the third packets; and each of said third packets includes said first header, and a part of data included in said first packet.

3. The linking apparatus according to claim 2, wherein said sending section receives two or more said third packets output from said receiving section, converts said third packets to said second packets, and outputs said second packets to said second port, said sending section adding a third header of the line protocol of said second network to said second packet, based on the first header added to said first packet.

4. The linking apparatus according to claim 1, wherein said receiving section identifies sequence information included in said first packet, and determines whether said first packet includes said first header.

5. The linking apparatus according to claim 1, wherein
a format of said first packet differs from a format of said second packet;
said first packet has a second header including said packet identification information and address information of said first network; and
said second packet has a third header including address information of said second network.

6. The linking apparatus according to claim 5, wherein said sending section generates said third header, and adds said generated third header to said first packet to convert said first packet to said second packet.

7. The linking apparatus according to claim 5, wherein said receiving section removes said second header from said first packet to output said first packet.

8. The linking apparatus according to claim 1, wherein
said first network is a SAN;
said second network is a LAN; and
said first header is an IP header.

9. A linking apparatus which is connected to first and second communication lines of different line protocols, and performs a packet relay between said first and second communication lines, comprising:
a first port connected to said first communication line for receiving a first packet from said first communication line, said first packet including two kinds of packets such that one kind of packet includes a first header of a line protocol of a higher layer than said protocols of said first and second communication lines, a second header of the protocol of said first communication line, packet identification information and user data, the other kind of packet includes said second header, said packet identification information and said user data, but does not include said first header, the latter packet that includes no first header is a packet of a plurality of packets divided from one packet, said packet identification information being information having a same value for the packets divided from a same packet so as to provide information for determining whether the packet is divided from a same packet or not;

a second port connected to said second communication line for sending a second packet to said second communication line;

a receiving section connected to said first port, said receiving section having a memory section storing at least one first header with being associated with packet identification information, determining whether said first packet includes the first header, and when the first header is included, storing in said memory section said packet identification information and first header of said first packet with said packet identification information and first header being associated with each other and outputting said first packet, and when the first header is not included, reading out from said memory section a first header, which is stored with being associated with a packet identification information having a same value as for the packet identification information included in said first packet, among the first headers stored in said memory section to output said first packet to which said read-out first header is added; and a sending section connected to said second port and said receiving section, said sending section receiving said first packet output from said receiving section, converting said first packet to said second packet, and outputting said second packet to said second port, said sending section adding a third header of the line protocol of said second communication line to said second packet based on the first header added to said first packet.

10. The linking apparatus according to claim 9, wherein said receiving section determines whether a packet length of said first packet to which said first header is added is greater than a value of a maximum packet length defined for said second communication line, and when the packet length of said first packet is greater than the value of the maximum packet length, divides said first packet to two or more third packets to output said third packets; and each of said third packets includes said first header, and a part of data included in said first packet.

11. The linking apparatus according to claim 10, wherein said sending section receives two or more said third packets output from said receiving section, converts said third packets to said second packets, and outputs said second packets to said second port, said sending section adding a third header of the line protocol of said second communication line to said second packet based on the first header added to said first packet.

12. The linking apparatus according to claim 9, wherein said receiving section identifies sequence information included in said first packet, and determines whether said first packet includes said first header.

13. The linking apparatus according to claim 9, wherein
a format of said first packet differs from a format of said second packet;

said first packet has a second header including said packet identification information, and address information of said first communication line; and said second packet has a third header including address information of said second communication line.

14. The linking apparatus according to claim 13, wherein said sending section generates said third header, and adds said generated third header to said first packet to convert said first packet to said second packet.

15. The linking apparatus according to claim 13, wherein said receiving section removes said second header from said first packet to output said first packet.

16. The linking apparatus according to claim 13, wherein said first communication line is a Fibre Channel line;
said second communication line is an Ethernet line;
said first header is an IP header;
said second header is an FC header; and
said third header is an Ethernet header.

17. A linking apparatus which is connected to a SAN and a LAN, and relays a packet, which is sent from a device connected to the SAN, to a device connected to the LAN, comprising:
- a first port connected to said SAN for receiving a first packet from said SAN, said first packet including two kinds of packets such that one kind of packet includes an IP header of a line protocol of a higher layer than line protocols of said SAN and LAN, a FC header of the line protocol of said SAN, packet identification information and user data, the other kind of packet includes said FC header, said packet identification information and said user data, but does not include said IP header, the latter packet that includes no IP header is a packet of a plurality of packets divided from one packet, said packet identification information being information having a same value for the packets divided from a same packet so as to provide information used for determining whether a packet is divided from a same packet or not;
- a second port connected to said LAN for sending a second packet to said LAN, said second packet having a format different from a format of said first packet; and
- a SAN process section connected to said first port for receiving said first packet received at said first port to output said first packet,
wherein said SAN process section, comprising:

- a memory section;
- an identification section for identifying whether said first packet includes an IP header;
- a storing section for storing, when said first packet includes the IP header, in said memory section packet identification information, which is included in said first packet, after being associated with said IP header;
- a header adding section for reading out, when said first packet does not include said IP header, from said memory section said IP header, which is stored with being associated with packet identification information having a same value as for the packet identification information included in said first packet, among said IP headers stored in said memory section to add said IP header to said first packet; and
- a LAN process section connected to said second port and said SAN process section, said LAN process section receiving said first packet output from said SAN process section, including a conversion section for converting said first packet to said second packet, and outputting said second packet to said second port, said LAN process section adding an Ethernet header of the line protocol of said LAN to said second packet based on the IP header added to said first packet.

18. The linking apparatus according to claim 17, wherein said SAN process section further comprises a dividing section for determining whether a packet length of said first packet to which said first header is added is greater than a value of a maximum packet length defined for said second network, and for dividing, when the packet length of said first packet is greater than the value of said maximum packet length, said first packet to two or more third packets to output said third packets;

said conversion section of said LAN process section receives two or more said third packets output from said SAN process section, and converts said third packets to said second packets; and said SAN process section removes said FC header, said dividing section adds an IP header to each of the divided third packets and said conversion section adds the Ethernet header to said second packet based on the IP headers added to said first and third packets.

* * * * *